US011909748B2

(12) United States Patent
Kishikawa et al.

(10) Patent No.: US 11,909,748 B2
(45) Date of Patent: Feb. 20, 2024

(54) ANTI-FRAUD CONTROL SYSTEM, MONITORING DEVICE, AND ANTI-FRAUD CONTROL METHOD

(71) Applicant: Panasonic Intellectual Property Corporation of America, Torrance (CA)

(72) Inventors: Takeshi Kishikawa, Osaka (JP); Ryo Hirano, Osaka (JP); Yoshihiro Ujiie, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 446 days.

(21) Appl. No.: 17/224,883

(22) Filed: Apr. 7, 2021

(65) Prior Publication Data
US 2021/0226966 A1  Jul. 22, 2021

Related U.S. Application Data

(63) Continuation of application No. PCT/JP2019/042777, filed on Oct. 31, 2019.

(30) Foreign Application Priority Data

Nov. 2, 2018  (WO) .................. PCT/JP2018/040832

(51) Int. Cl.
*H04L 29/06* (2006.01)
*H04L 9/40* (2022.01)
(Continued)

(52) U.S. Cl.
CPC .......... *H04L 63/1416* (2013.01); *H04L 1/201* (2013.01); *H04L 12/44* (2013.01)

(58) Field of Classification Search
CPC ..... H04L 63/1416; H04L 1/201; H04L 12/44; H04L 2012/40241; H04L 12/40104;
(Continued)

(56) References Cited

U.S. PATENT DOCUMENTS

2010/0014439 A1*  1/2010  Fuhrmann ......... H04L 12/40013
                                                370/252
2010/0262689 A1* 10/2010  Ungermann ...... H04L 12/40032
                                                709/224
(Continued)

FOREIGN PATENT DOCUMENTS

JP         5664799          2/2015
WO    WO-2015151418 A1 * 10/2015  ............. H04L 12/40

OTHER PUBLICATIONS

Official Communication issued in International Patent Application No. PCT/JP2018/040832, dated Jan. 8, 2019, along with an English translation thereof.
(Continued)

*Primary Examiner* — Harunur Rashid
(74) *Attorney, Agent, or Firm* — Greenblum & Bernstein, P.L.C.

(57) ABSTRACT

In an anti-fraud control system, a first error monitoring device includes a first frame transmitting and receiving unit that receives a frame flowing on the on-board network; and a first error detector that causes transmission of an error notification frame for notifying of an occurrence of an error in the frame when detecting the occurrence of the error in the frame received by the first frame transmitting and receiving unit. Each of second error monitoring devices includes: a second frame transmitting and receiving unit that receives the error notification frame; and a second error detector that regards, as a frame to be invalidated, the frame subjected to the error and included in the received error notification frame, and shifts the second error monitoring device to an
(Continued)

invalidation mode for invalidating reception of subsequent frames, if no error is detected in an own branch with respect to the frame.

14 Claims, 21 Drawing Sheets

(51) Int. Cl.
*H04L 1/20* (2006.01)
*H04L 12/44* (2006.01)

(58) Field of Classification Search
CPC ............. H04L 63/0281; H04L 63/0823; H04L 63/108; H04L 2001/0093
See application file for complete search history.

(56) References Cited

U.S. PATENT DOCUMENTS

2014/0047282 A1* 2/2014 Deb .................. H04L 41/06
714/48
2014/0328352 A1* 11/2014 Mabuchi ............ H04L 12/4035
370/451

OTHER PUBLICATIONS

Official Communication issued in International Patent Application No. PCT/JP2019/042777, dated Nov. 26, 2019, along with an English translation thereof.

* cited by examiner

FIG. 7

| COMMUNICATION SETTING PARAMETER | VALUE |
|---|---|
| BAUD RATE | 10 Mbps |
| SLOT IDS FOR STATIC SEGMENTS | 1~50 |
| SLOT IDS FOR DYNAMIC SEGMENTS | 51~100 |
| PAYLOAD LENGTH OF STATIC SLOTS | 8 |
| ... | ... |

FIG. 8

| SLOT ID | CYCLE OFFSET | RECEPTION CYCLE | TRANSMITTER BRANCH INFORMATION | PAYLOAD INFORMATION |
|---|---|---|---|---|
| 1 | 0 | 1 | 100b | SPEED |
| 2 | | | | |
| 3 | 0 | 2 | 100a | STEERING WHEEL ANGLE |
| 4 | 1 | 2 | 100b | GEAR STAGE |
| 5 | 0 | 1 | 100b | BRAKE HYDRAULIC PRESSURE |
| 6 | 2 | 4 | 100d | STEERING INSTRUCTION |
| ... | ... | ... | ... | ... |

FIG. 9

| SLOT ID | CYCLE OFFSET | RECEPTION CYCLE | TRANSMITTER BRANCH INFORMATION | PAYLOAD INFORMATION |
|---|---|---|---|---|
| 51 | 1 | 8 | 100a | ID:1 ERROR NOTIFICATION |
| | 2 | 8 | 100b | ID:1 ERROR NOTIFICATION |
| | 3 | 8 | 100c | ID:1 ERROR NOTIFICATION |
| | 4 | 8 | 100d | ID:1 ERROR NOTIFICATION |
| 53 | CORRESPONDING TO TRANSMITTER BRANCH | 8 | ALL | ID:3 ERROR NOTIFICATION |
| ... | ... | ... | ... | ... |
| 56 | CORRESPONDING TO TRANSMITTER BRANCH | 8 | ALL | ID:6 ERROR NOTIFICATION |
| ... | ... | ... | ... | ... |
| 100 | CORRESPONDING TO TRANSMITTER BRANCH | 8 | ALL | ANOMALY NOTIFICATION |

FIG. 10

| PARAMETER | | VALUE |
|---|---|---|
| BRANCH (OWN BRANCH) | 100a | |
| MODE | | NORMAL |
| SLOT ID: 1 | | |
| NUMBER OF RECEPTIONS | 100a | 0 (ERROR NUMBER) |
| | 100b | 0 |
| | 100c | 0 |
| OF ERROR NOTIFICATION FRAME (ERROR NUMBER IN OWN BRANCH) | 100d | 0 |
| SLOT ID: 3 | | |
| NUMBER OF RECEPTIONS | 100a | 10 (ERROR NUMBER) |
| | 100b | 0 |
| | 100c | 0 |
| OF ERROR NOTIFICATION FRAME (ERROR NUMBER IN OWN BRANCH) | 100d | 0 |
| ⋮ | | ⋮ |

FIG. 11A

| SLOT ID | CYCLE | PAYLOAD (HEX NUMBER) |
|---------|-------|----------------------|
| 56 | 17 | 01 01 01 00 |

- TRANSMITTER BRANCH
  - 1: 100a
  - 2: 100b
  - 3: 100c
  - 4: 100d

- FRAME CONTENT
  - 1: ERROR NOTIFICATION
  - 2: REQUEST FOR MODE CHANGE

- ERROR INFORMATION
  - 0: NO ERROR
  - 1: SYNTAX ERROR
  - 2: CONTENT ERROR
  - 3: BOUNDARY VIOLATION
  - 4: TX CONFLICT

- MODE CHANGE INFORMATION
  - 0: NORMAL MODE
  - 1: INVALIDATION MODE
  - 2: MALFUNCTION MODE

FIG. 11B

| SLOT ID | CYCLE | PAYLOAD (HEX NUMBER) |
|---------|-------|----------------------|
| 100 | 1 | 01 01 00 38 |

- TRANSMITTER BRANCH
  - 1: 100a
  - 2: 100b
  - 3: 100c
  - 4: 100d

- ANOMALY CODE
  - 1: NON-TRANSMISSIBLE
  - 2: IMPERSONATION DETECTION

- SLOT ID SUBJECTED TO ERROR

FIG. 15

| SLOT ID | CYCLE | PAYLOAD (HEX NUMBER) |
|---------|-------|----------------------|
| 56 | 17 | 04 01 02 01 01 |

TRANSMITTER
BRANCH
1:100a
2:100b
3:100c
4:100d

DESTINATION
BRANCH
1:100a
2:100b
3:100c
4:100d
FF: ALL

FRAME CONTENT
1: ERROR
NOTIFICATION
2: REQUEST FOR
MODE CHANGE

ERROR INFORMATION
0: NO ERROR
1: SYNTAX ERROR
2: CONTENT ERROR
3: BOUNDARY VIOLATION
4: TX CONFLICT

MODE CHANGE
INFORMATION
0: NORMAL MODE
1: INVALIDATION MODE
2: MALFUNCTION MODE

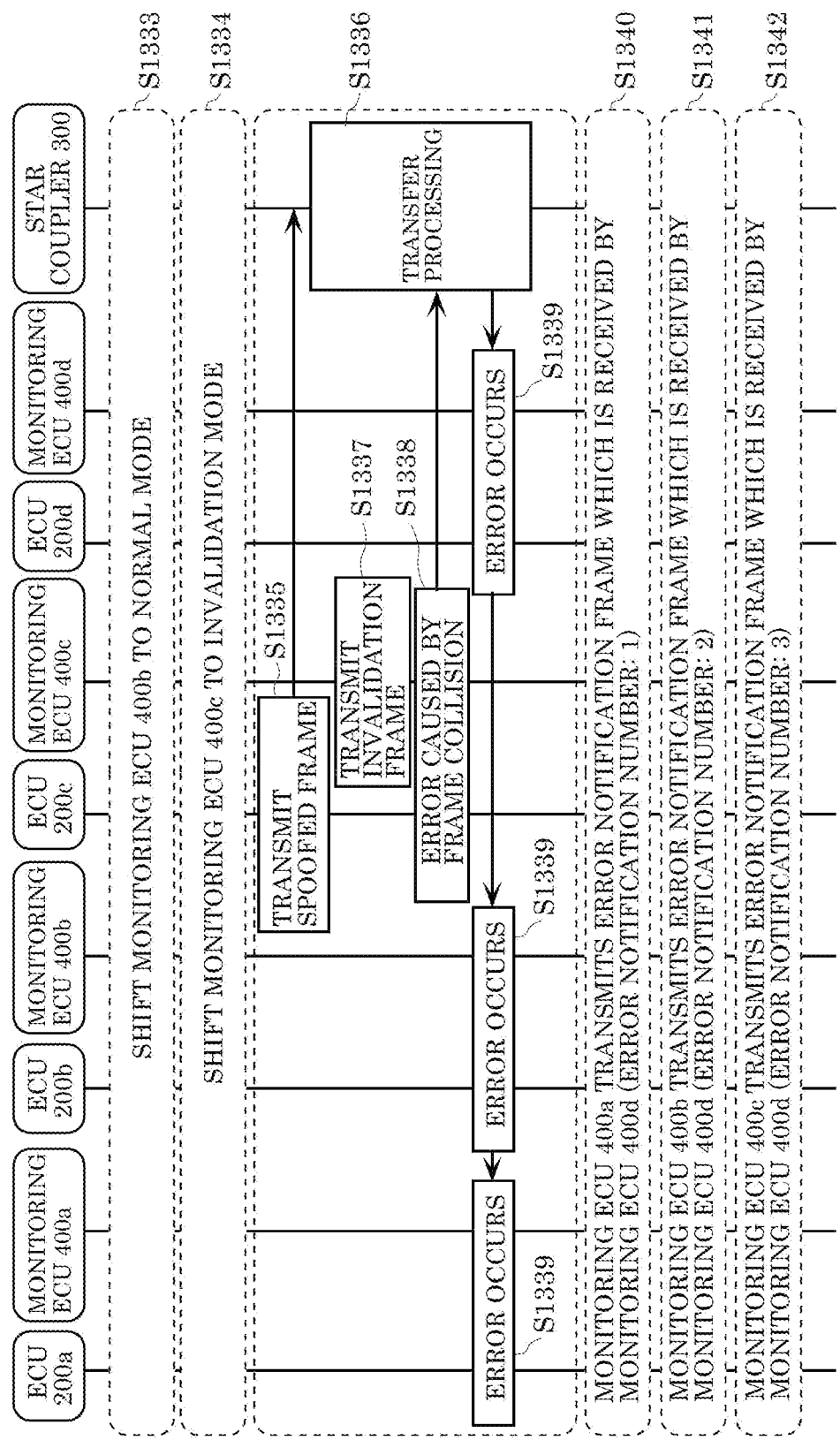

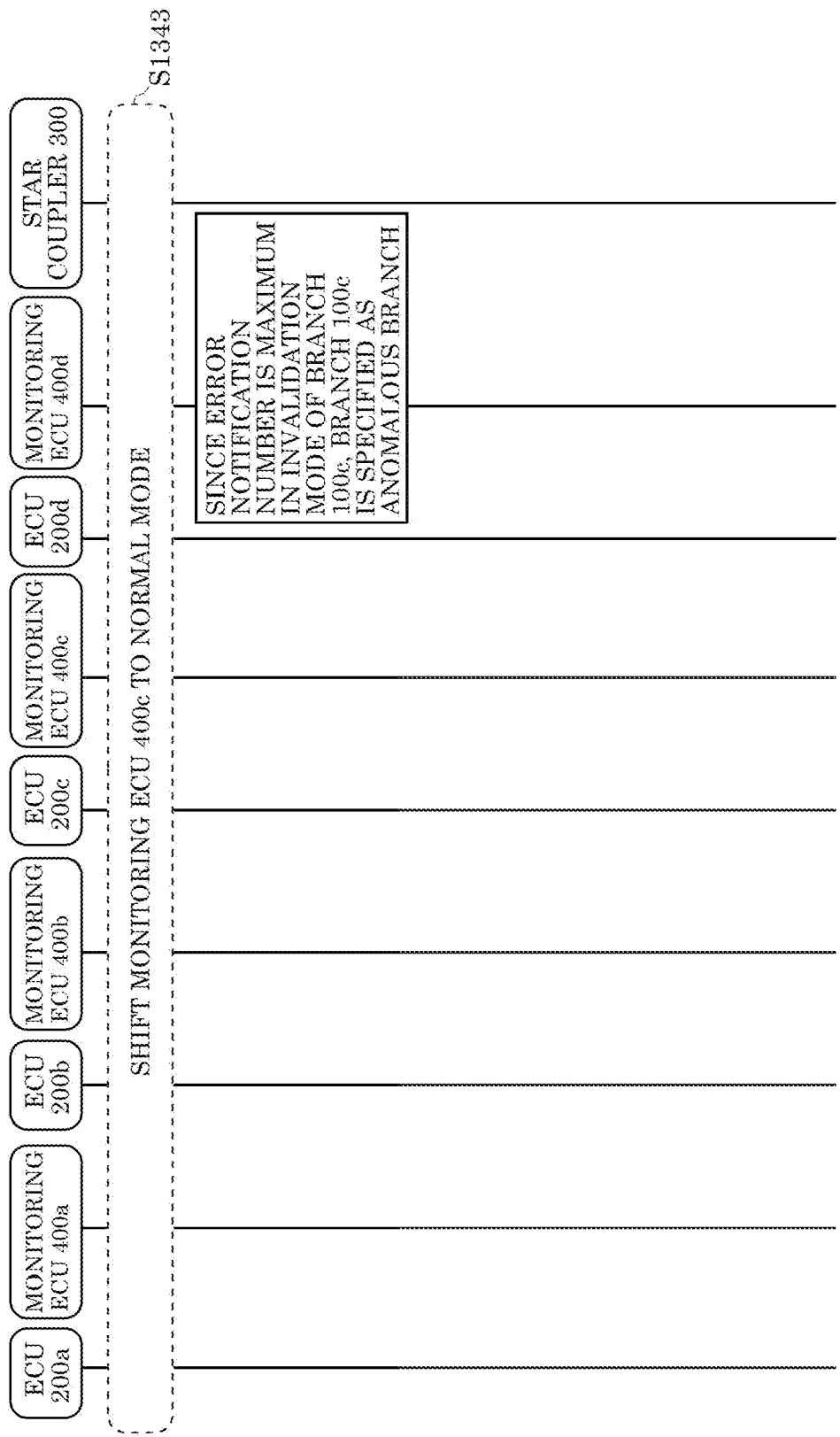

ANTI-FRAUD CONTROL SYSTEM, MONITORING DEVICE, AND ANTI-FRAUD CONTROL METHOD

CROSS REFERENCE TO RELATED APPLICATIONS

This application is a U.S. continuation application of PCT International Patent Application Number PCT/JP2019/042777 filed on Oct. 31, 2019, claiming the benefit of priority of PCT International Patent Application Number PCT/JP2018/040832 filed on Nov. 2, 2018, the entire contents of which are hereby incorporated by reference.

BACKGROUND

1. Technical Field

The present disclosure relates to an anti-fraud control system, a monitoring device, and an anti-fraud control method that invalidate transmission of unauthorized frames in an on-board network.

2. Description of the Related Art

In recent years, a large number of devices called "electronic control units" (hereinafter referred to as "ECUs") are arranged in systems inside motor vehicles. The network connecting these ECUs is called an "on-board network".

There are a lot of protocols for on-board networks. Among them, there is a protocol called "FlexRay" designed to have higher speed and higher reliability than a controller area network (hereinafter referred to as a "CAN") that is mainly used at present.

Under FlexRay, the voltage differences between two strands represent the values "0" and "1". ECUs connected to a bus are called "nodes" that transmit and receive messages called "frames". FlexRay is based on time division multiple access (hereinafter referred to as "TDMA") in which the nodes transmit the frames at predetermined times.

Under FlexRay, there are cycles that are the maximum time units. The nodes are synchronized at global times. Each cycle includes four segments of a "static segment", a "dynamic segment", a "symbol window", and a "network idle time". The dynamic segment and the symbol window are optional. The static and dynamic segments include times each allowing transmission of one frame called "slot". The nodes transmit the frames at predetermined times in the static and dynamic segments.

Under FlexRay, there is no identifiers indicating destinations or transmitters. Transmitting nodes transmit the frames based on slot numbers indicating transmission times determined in advance for the respective frames. Receiving nodes receive only the frames with the slot numbers determined in advance. The frames with the same slot number can be transmitted at different times by a method called "cycle multiplexing" for achieving transmission of frames in different cycles.

In this manner, FlexRay employs the time-triggered communication protocol based on time slots.

FlexRay can be achieved not only by a bus network topology as in CAN in which all nodes are connected to a bus, but also by a star network topology via a star coupler or a hybrid of the bus and star network topologies.

For example, in the star network topology, a star coupler routes signals of a plurality of busses called "branches" to achieve the synchronization throughout the network. Under the specification, the star coupler routes the signals transmitted earliest among the signals of the branches. Assume that there is an unauthorized ECU in one of the branches, which transmits an unauthorized frame earlier than the transmission of an authorized frame by an authorized ECU. Depending on the specification of the star coupler, the authorized frame may be ignored and the unauthorized frame may be routed. The routing of the unauthorized frame may cause fraud control of a vehicle.

Under such circumstances, for example, Japanese Patent No. 5664799 (Patent Literature (PTL) 1) suggests a fraud detection method for detecting unauthorized frames in an on-board network and an anti-fraud method. More specifically, PTL 1 discloses an on-board network monitoring device that monitors whether frames are transmitted at predetermined communication intervals and determines, as unauthorized frames, the frames out of the predetermined communication intervals not to allow control by the unauthorized frames.

SUMMARY

However, under the time-triggered communication protocol FlexRay, communications are made at predetermined communication intervals. The frames having a specific identifier are always received at equal intervals. Accordingly, the fraud detection technique disclosed in PTL 1 is inapplicable to an on-board network under FlexRay.

The present disclosure was made under the circumstances described above. It is an objective of the present disclosure to provide an anti-fraud control system, a monitoring device, and an anti-fraud control method that allow invalidation of transmission of unauthorized frames in an on-board network.

In order to achieve the objective, an anti-fraud control system according to an aspect of the present disclosure is in an on-board network under a time-triggered communication protocol based on time slots. The on-board network is connected, for each of branches, to one or more electronic control devices each transmitting and receiving a frame within a predetermined time slot. The anti-fraud control system includes error monitoring devices each for a corresponding one of the branches. A first error monitoring device among the error monitoring devices includes: a first frame transmitting and receiving unit that receives the frame flowing on the on-board network: and a first error detector that monitors whether an error occurs in the frame received by the first frame transmitting and receiving unit, and causes the first frame transmitting and receiving unit to transmit an error notification frame when detecting an occurrence of an error in the frame received by the first frame transmitting and receiving unit, the error notification frame containing information identifying a type of the frame subjected to the error and for notifying of the occurrence of the error in the frame. Each of one or more second error monitoring devices different from the first error monitoring device among the error monitoring devices includes: a second frame transmitting and receiving unit that receives the error notification frame; and a second error detector that regards, as a frame to be invalidated, the frame subjected to the error and included in the error notification frame received, and shifts the second error monitoring device to an invalidation mode for invalidating reception of subsequent frames, if no error is detected in the corresponding one of the branches with respect to the frame.

In order to achieve the objective, a monitoring device according to an aspect of the present disclosure is in an on-board network under a time-triggered communication protocol based on time slots. The on-board network is connected to, for one of branches, one or more electronic control devices each transmitting and receiving a frame within a predetermined time slot. The monitoring device is provided for a corresponding one of the branches and includes: a frame transmitting and receiving unit that receives an error notification frame transmitted for notifying of an occurrence of an error in the frame flowing on the on-board network and containing information identifying a type of the frame subjected to the error at the occurrence of the error in the frame; and an error detector that regards, as a frame to be invalidated, the frame subjected to the error and included in the error notification frame received, and shifts the monitoring device to an invalidation mode for invalidating reception of subsequent frames, if no error is detected in the corresponding one of the branches with respect to the frame.

In order to achieve the objective, an anti-fraud control method according to an aspect of the present disclosure uses an anti-fraud control system in an on-board network under a time-triggered communication protocol based on time slots. The on-board network is connected, for each of branches, to one or more electronic control devices each transmitting and receiving a frame within a predetermined time slot. The anti-fraud control system includes error monitoring devices each for a corresponding one of the branches. The anti-fraud control method includes: receiving the frame flowing on the on-board network using a first error monitoring device among the error monitoring devices; monitoring whether an error occurs in the frame received in the receiving using the first error monitoring device, and transmitting an error notification frame in the receiving, if an occurrence of an error is detected in the frame received in the receiving, the error notification frame containing information identifying a type of the frame subjected to the error and for notifying of the occurrence of the error in the frame; receiving the error notification frame using each of one or more second error monitoring devices different from the first error monitoring device of the error monitoring device; and regarding, as a frame to be invalidated, the frame subjected to the error and included in the error notification frame received in receiving of the error notification frame, and shifting the one or more second error monitoring devices to an invalidation mode for invalidating reception of subsequent frames, if no error is detected in the corresponding one of the branches with respect to the frame.

These general and specific aspects may be implemented using a, device, a system, an integrated circuit, a computer program, or a computer-readable recording medium such as a CD-ROM, or any combination of devices, systems, methods, computer programs, or computer-readable recording media.

The anti-fraud control system and other aspects of the present disclosure allow invalidation of transmission of unauthorized frames in an on-board network. Accordingly, the on-board network system is kept safe as a whole.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7 shows example communication setting parameters according to the embodiment;

FIG. 8 shows an example authorized ID list for static frames according to the embodiment;

FIG. 9 shows an example authorized ID list for dynamic frames according to the embodiment;

FIG. 10 shows example branch conditions according to the embodiment;

FIG. 11A shows an example error notification frame according to the embodiment;

FIG. 11B shows an example anomaly notification frame according to the embodiment;

FIG. 15 shows an example transition frame for invaliding a branch according to a variation of the embodiment;

FIG. 16C shows the example operation sequence in which the anti-fraud control system according to the variation of the embodiment sequentially switch the branches to the invalidation mode to identify the branch including the unauthorized ECU; and FIG. 16D shows the example operation sequence in which the anti-fraud control system according to the variation of the embodiment sequentially switch the branches to the invalidation mode to identify the branch including the unauthorized ECU.

DETAILED DESCRIPTION OF THE EMBODIMENT

Figure 1:
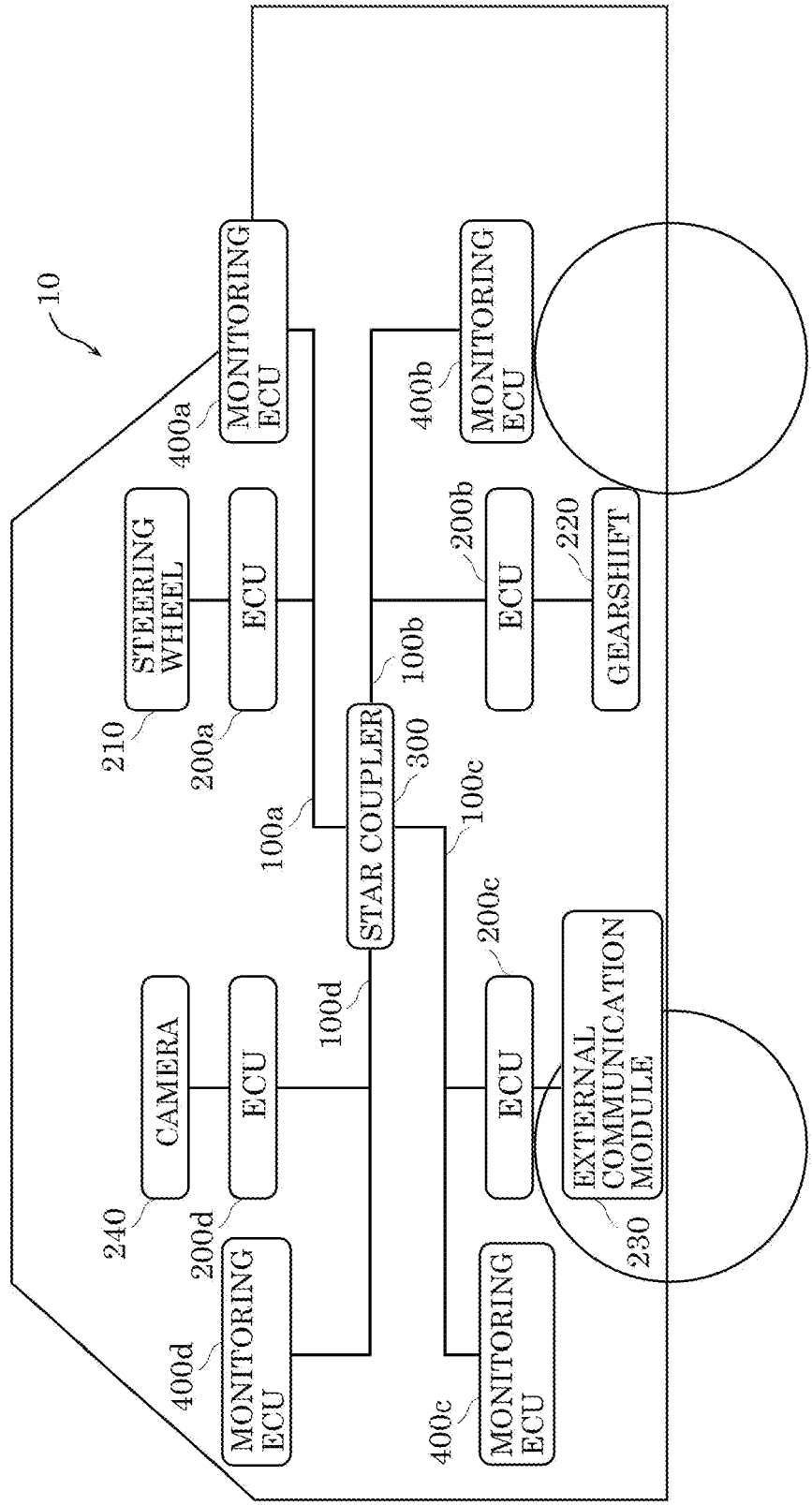
FIG. 1 shows an overall configuration of an on-board network system according to an embodiment.

An anti-fraud control system according to an aspect of the present disclosure is in an on-board network under a time-triggered communication protocol based on time slots. The on-board network is connected, for each of branches, to one or more electronic control devices each transmitting and receiving a frame within a predetermined time slot. The anti-fraud control system includes error monitoring devices each for a corresponding one of the branches. A first error monitoring device among the error monitoring devices includes: a first frame transmitting and receiving unit that receives the frame flowing on the on-board network; and a first error detector that monitors whether an error occurs in the frame received by the first frame transmitting and receiving unit, and causes the first frame transmitting and receiving unit to transmit an error notification frame when detecting an occurrence of an error in the frame received by the first frame transmitting and receiving unit, the error notification frame containing information identifying a type of the frame subjected to the error and for notifying of the occurrence of the error in the frame. Each of one or more second error monitoring devices different from the first error monitoring device among the error monitoring devices includes: a second frame transmitting and receiving unit that receives the error notification frame; and a second error detector that regards, as a frame to be invalidated, the frame subjected to the error and included in the error notification frame received, and shifts the second error monitoring device to an invalidation mode for invalidating reception of subsequent frames, if no error is detected in the corresponding one of the branches with respect to the frame.

This configuration allows invalidation of the transmission of the unauthorized frames in the on-board network under the time-triggered communication protocol based on the time slots. More specifically, the anti-fraud control system, for example, according to the present disclosure detects the transmission of an unauthorized frame based on the mismatch in an error occurrence (status) in the on-board network. Detecting the transmission of the unauthorized frame, the system invalidates the reception of subsequent unauthorized frames to invalidate the transmission of the unauthorized frames. In this manner, the safety of the on-board network improves through the achievement of the fail-safe function.

In each of the one or more second error monitoring devices, the second frame transmitting and receiving unit may transmit/receive a frame within a predetermined time slot of the on-board network. When the second error monitoring device is in the invalidation mode, the second error detector may invalidate reception of the frame to be invalidated by causing the second frame transmitting and receiving unit not to receive the frame to be invalidated or by causing the second frame transmitting and receiving unit to transmit a frame having a same identifier as the frame to be invalidated in a same time slot as the frame to be invalidated.

This configuration allows proper invalidation of the unauthorized frames, thereby improving the safety of the on-board network.

In the first error monitoring device, when detecting that no error notification frame for notifying of an occurrence of an error in the corresponding one of the branches is received from the one or more second error monitoring devices with respect to the frame subjected to the error and included in the error notification frame transmitted by the first frame transmitting and receiving unit, the first error detector may cause the first frame transmitting and receiving unit to transmit a mode transition frame for shifting the one or more second error monitoring devices to the invalidation mode. In each of the one or more second error monitoring devices, when detecting that the second frame transmitting and receiving unit has received the mode transition frame, the second error detector may determine that no error is detected in the corresponding one of the branches and shift the second error monitoring device to the invalidation mode.

This configuration allows invalidation of the unauthorized frames, even if the frame for notifying of an error is replaced with an unauthorized frame. Accordingly, the safety of the on-board network improves.

In the first error monitoring device, when detecting that no error notification frame for notifying of an occurrence of an error in the corresponding one of the branches is received from the one or more second error monitoring devices with respect to the frame subjected to the error and included in the error notification frame transmitted by the first frame transmitting and receiving unit, the first error detector may cause the first frame transmitting and receiving unit to transmit the mode transition frame for shifting the one or more second error monitoring devices to the invalidation mode. The first error detector may further monitor whether an error occurs in the mode transition frame transmitted by the first frame transmitting and receiving unit, and cause the first frame transmitting and receiving unit to transmit an anomaly notification frame for notifying of an occurrence of an anomaly in transmitting and receiving the mode transition frame, when detecting the occurrence of the error in the mode transition frame. In each of the one or more second error monitoring devices, when detecting that the second frame transmitting and receiving unit has received the anomaly notification frame, the second error detector may shift the second error monitoring device to the invalidation mode.

This configuration allows invalidation of the unauthorized frames, even if the frame for notifying of an error is replaced with an unauthorized frame. Accordingly, the safety of the on-board network improves.

Each of the one or more second error monitoring devices may further include an error state holder that holds at least one of a total number of error detections or a total number of receptions of an error notification frame for each frame type. In the first error monitoring device, the first error detector may further monitor whether an error occurs in the error notification frame transmitted by the first frame transmitting and receiving unit, and cause the first frame transmitting and receiving unit to transmit an anomaly notification frame for notifying of an occurrence of an anomaly in transmitting and receiving the error notification frame when detecting the occurrence of the error in the error notification frame. In each of the one or more second error monitoring devices, when the second frame transmitting and receiving unit has received the anomaly notification frame, the second error detector may regard, as the frame to be invalidated, a frame whose number of error detections or whose number of receptions held in the error state holder is greater than or equal to a predetermined number, and shift the second error monitoring device to the invalidation mode.

This configuration allows invalidation of the unauthorized frames, even if the frame for notifying of an error is replaced with an unauthorized frame. In addition, the shift to the invalidation mode is possible without transmitting any mode transition frame to the invalidation mode, which is advantages in invalidating the unauthorized frames earlier. Accordingly, the safety of the on-board network further improves.

The time-triggered communication protocol may be a FlexRay protocol. The error may be any one of a synchronization (sync) error, a content error, a boundary violation, or a transmission (Tx) conflict defined by the FlexRay protocol.

This configuration allows invalidation of transmission of unauthorized frames in the on-board network employing FlexRay.

The on-board network may be based on a star topology including a star coupler to transmit and receive a frame to and from the branches via the star coupler. The error notification frame may be a dynamic frame under the FlexRay protocol. The first frame transmitting and receiving unit may determine a total number of cycles of transmitting the error notification frame in accordance with one of the branches connected to the first error monitoring device.

This configuration allows efficient use of slot IDs and transmission/reception of the error notification frame in star FlexRay. Accordingly, proper invalidation of the unauthorized frames is possible while maintaining the design flexibility of the on-board network, which improves the safety.

In the first error monitoring device, the first error detector may cause the first frame transmitting and receiving unit to transmit a transition frame for invalidating one branch among the branches to prepare a period in which at least one of the one or more second error monitoring devices connected to the one branch shifts to the invalidation mode and others of the one or more second error monitoring devices connected to one or more of the branches other than the one branch do not shift to the invalidation mode, and detect a total number of error notification frames received from the at least one of the one or more second error monitoring devices during the period. After a lapse of a predetermined time after the first frame transmitting and receiving unit has transmitted the transition frame, the first error detector may cause the first frame transmitting and receiving unit to transmit another transition frame for invalidating another branch among the branches to cause the first frame transmitting and receiving unit to transmit transition frames for sequentially invalidating the branches. One of the branches detected as having a maximum number of error notification frames may be determined as an unauthorized branch.

This configuration clearly identifies the branch that transmits the unauthorized frame and provides the information useful for taking countermeasures, which allows invalidation of transmission of the unauthorized frames in the on-board network.

The transition frame may contain a validation flag indicating a shift to the invalidation mode and a value identifying a branch to be shifted to the invalidation mode.

In each of the one or more second error monitoring devices, when the second frame transmitting and receiving unit receives the transition frame and the branch identified by the value contained in the transition frame is identical to the one of the branches connected to the second error monitoring device, the second error detector may shift the second error monitoring device to the invalidation mode.

In each of the one or more second error monitoring devices, the second frame transmitting and receiving unit may transmit a first frame within a predetermined time slot of the on-board network. When the one or more second error monitoring devices is in the invalidation mode, the second error detector may cause the second frame transmitting and receiving unit to transmit the first frame at a transmission start time earlier than a predetermined transmission start time within the predetermined time slot to invalidate reception of the frame to be invalidated.

With this configuration, the authorized frame starts being transmitted earlier than the unauthorized frame, which reduces the influence of the unauthorized frame. That is, the configuration allows invalidation of transmission of the unauthorized frames in the on-board network.

A monitoring device according to an aspect of the present disclosure is in an on-board network under a time-triggered communication protocol based on time slots. The on-board network is connected to, for one of branches, one or more electronic control devices each transmitting and receiving a frame within a predetermined time slot. The monitoring device is provided for a corresponding one of the branches and includes: a frame transmitting and receiving unit that receives an error notification frame transmitted for notifying of an occurrence of an error in the frame flowing on the on-board network and containing information identifying a type of the frame subjected to the error at the occurrence of the error in the frame; and an error detector that regards, as a frame to be invalidated, the frame subjected to the error and included in the error notification frame received, and shifts the monitoring device to an invalidation mode for invalidating reception of subsequent frames, if no error is detected in the corresponding one of the branches with respect to the frame.

With this configuration, the device detects the transmission of the unauthorized frame based on the mismatch in the error occurrence (status) and invalidates the transmission to improve the safety of the on-board network system.

An anti-fraud control method according to an aspect of the present disclosure uses an anti-fraud control system in an on-board network under a time-triggered communication protocol based on time slots. The on-board network is connected, for each of branches, to one or more electronic control devices each transmitting and receiving a frame within a predetermined time slot. The anti-fraud control system includes error monitoring devices each for a corresponding one of the branches. The anti-fraud control method includes: receiving the frame flowing on the on-board network using a first error monitoring device among the error monitoring devices; monitoring whether an error occurs in the frame received in the receiving using the first error monitoring device, and transmitting an error notification frame in the receiving, if an occurrence of an error is detected in the frame received in the receiving, the error notification frame containing information identifying a type of the frame subjected to the error and for notifying of the occurrence of the error in the frame; receiving the error notification frame using each of one or more second error monitoring devices different from the first error monitoring device of the error monitoring device; and regarding, as a frame to be invalidated, the frame subjected to the error and included in the error notification frame received in receiving of the error notification frame, and shifting the one or more second error monitoring devices to an invalidation mode for invalidating reception of subsequent frames, if no error is detected in the corresponding one of the branches with respect to the frame.

Now, an on-board network system according to this embodiment will be described with reference to the drawings. Note that the embodiment described below is a mere specific example of the present disclosure. The numerical values, constituent elements, the arrangement and connection of the constituent elements, steps, step orders etc. shown in the following embodiment are thus mere examples, and are not intended to limit the scope of the present disclosure. Among the constituent elements in the following embodiment, those not recited in any of the independent claims may be added freely. The figures are schematic representations and not necessarily drawn strictly to scale.

Embodiment 1

1. System Configuration

Now, an anti-fraud control system of an on-board network according to this embodiment will be described with reference to the drawings.

1.1 Overall Configuration of On-Board Network System 10

FIG. 1 shows an overall configuration of on-board network system 10 according to this embodiment.

On-board network system 10 includes an on-board network under a time-triggered communication protocol based on time slots by the star topology including a star coupler via which frames are transmitted to and received from a plurality of branches. The on-board network is, in each branch, connected to one or more electronic control devices that transmit and receive frames within predetermined time slots. In addition, on-board network system 10 includes an error monitoring device for each branch. Note that the time-triggered communication protocol based on the time slots is, for example, the FlexRay protocol.

In this embodiment, as shown in FIG. 1, on-board network system 10 includes branches 100a, 100b, 100c, and 100d, ECUs 200a, 200b, 200c, and 200d, monitoring ECUs 400a, 400b, 400c, and 400d, steering wheel 210, gearshift 220, external communication module 230, camera 240, and star coupler 300.

ECUs 200a to 200d are connected to associated branches and transmit and receive frames through the associated branches to achieve the control of the vehicle. In the example shown in FIG. 1, ECU 200a controls the control target, steering wheel 210, whereas ECU 200b controls the control target, gearshift 220. ECU 200c controls the control target, external communication module 230, whereas ECU 200d controls the control target, camera 240. ECUs 200a to 200d are also called "nodes". Details of ECUs 200a to 200d will be described later.

Monitoring ECUs 400a, 400b, 400c, and 400d are examples of the "error monitoring devices" connected to the respective branches. Monitoring ECUs 400a, 400b, 400c, and 400d monitor respective branches 100a, 100b, 100c, and 100d to detect transmission of unauthorized frames and invalidate the unauthorized frames. Details will be described later.

Star coupler 300 connects branches 100a, 100b, 100c, and 100d. Star coupler 300 shapes signals so that the same signals flow through branches 100a, 100b, 100c, and 100d. On-board network system 10 includes star coupler 300 so that ECUs 200a, 200b, 200c, and 200d are synchronized at times among branches 100a, 100b, 100c, and 100d. Details of will be described later.

1.2 FlexRay Communication

Figure 2:
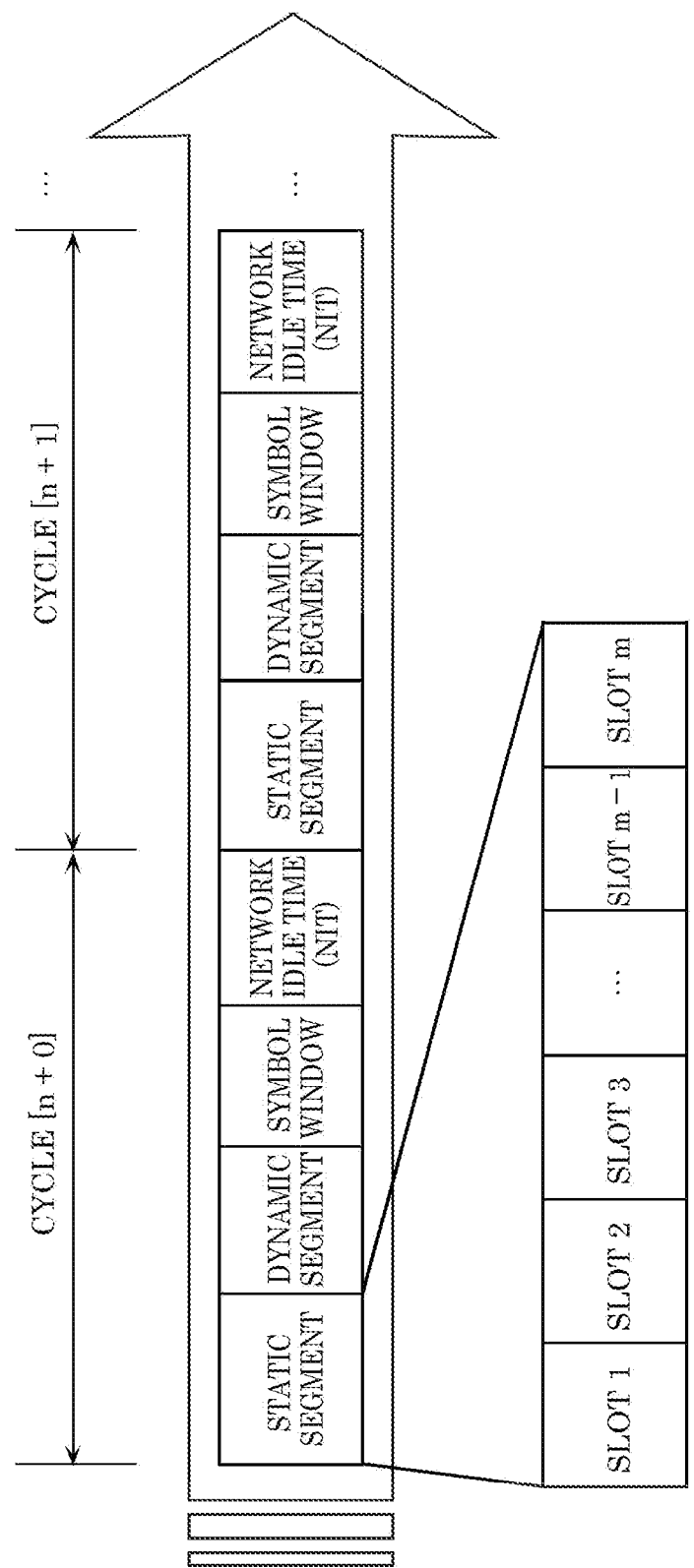
FIG. 2 shows a FlexRay communication cycle according to the embodiment.

FIG. 2 shows a FlexRay communication cycle according to this embodiment. Flex Ray communications (i.e., communications under the FlexRay protocol) is performed under the units called "cycles" in FIG. 2. The number of cycles (the cycle count) held in synchronization among the nodes. This cycle count ranges from 0 to 63. If the cycle count is, for example, 63, the next cycle starts with the reset cycle count 0.

As shown in FIG. 2, each cycle includes four segments of a static segment, a dynamic segment, a symbol window, and a network idle time (NIT).

The times for the segments are common throughout the FlexRay network (i.e., cluster) based on parameters designed in advance. The times for the cycles are common in the cluster.

Each static segment includes a plurality of slots. The numbers of and times for slots are common within the cluster.

Since each of frames is transmitted within one of the slots in the FlexRay communications, the number of the slot (i.e., the slot number) serves at the identifier of the frame (i.e., Frame ID). In this embodiment, ECUs 200a, 200b, 200c, and 200d are designed to transmit frames at predetermined times (i.e., in slot numbers). The frames transmitted within the static segments are referred to as "static frames". The static frames have a common payload length, within the cluster.

Although not shown, each dynamic segment includes slots called "mini-slots". The mini-slots also have slot numbers. In this embodiment, ECUs 200a, 200b, 200c, and 200d are designed to transmit frames at predetermined times (i.e., slot numbers). Unlike the static segments, however, frames are not necessarily transmitted. The frames transmitted within the dynamic segments are referred to as "dynamic frames". Each dynamic frame may have, as a payload length, any value within the range from 0 to 254.

The symbol windows are time frames for transmitting and receiving signals called "symbols".

Each network idle times (NIT) is a time frame without communications and is necessarily provided at the end of the associated cycle. ECUs 200a, 200b, 200c, and 200d perform synchronous processing.

1.3 Frame Format

Figure 3:
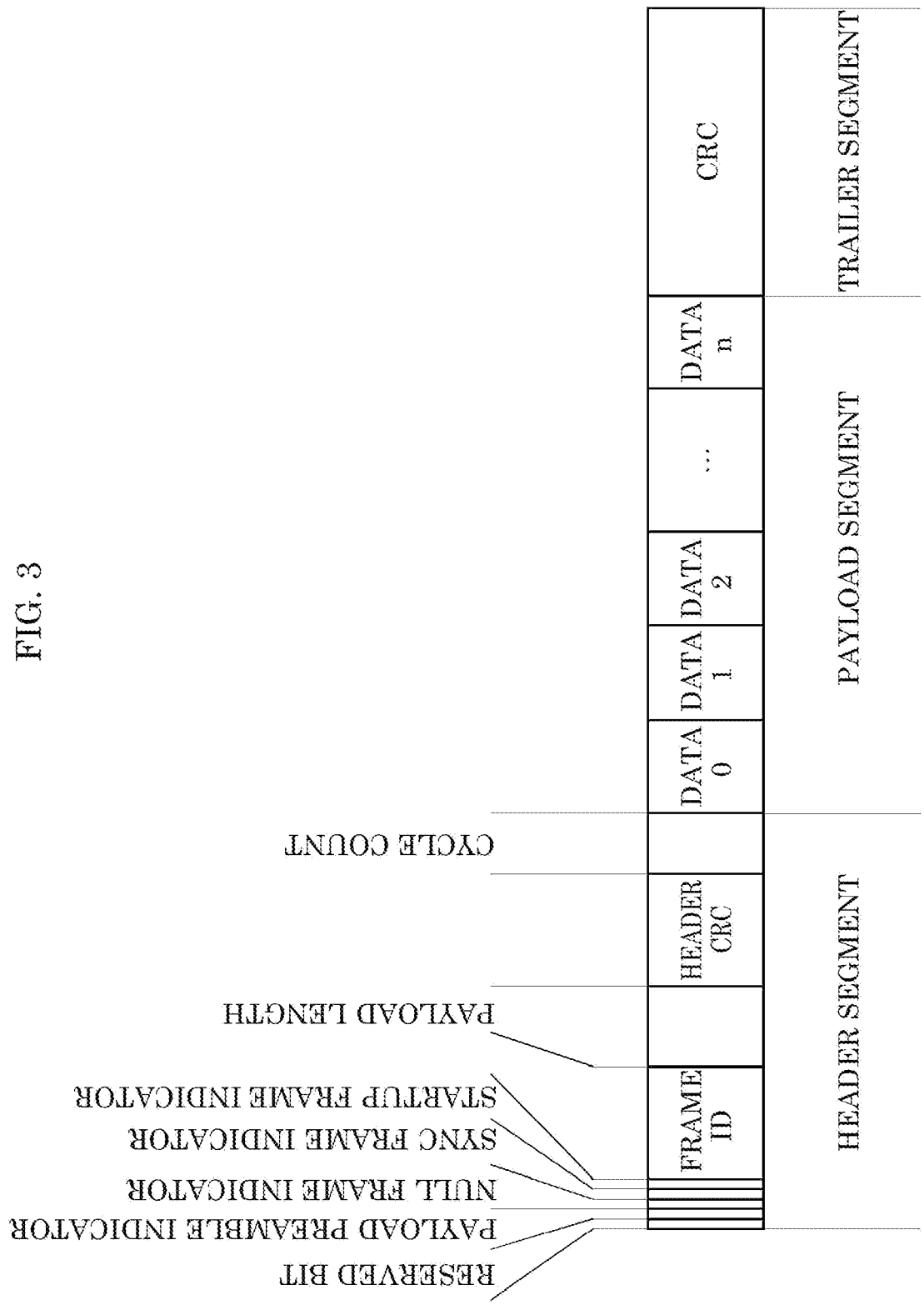
FIG. 3 shows a frame format under the FlexRay protocol according to the embodiment.

FIG. 3 shows a frame format under the FlexRay protocol according to this embodiment. The frame format is common between the static and dynamic frames. Each frame includes three segments of a header segment, a payload segment, and a trailer segment.

The header segment includes, starting with a reserved bit, a payload preamble indicator, a null frame indicator, a sync frame indicator, and a startup frame indicator, each being 1 bit in size. The payload preamble indicator, the null frame indicator, the sync frame indicator, and the startup frame indicator are for representing frame types.

The header segment further includes a frame ID of 11 bits, a payload length of 7 bits, a header CRC of 11 bits, and a cycle count of 6 bits.

The frame IDs are also called "slot IDs" used for identifying the transmission times and contents of the frames The payload length has the value of 127 at the maximum.

Stored as the payload segment is the byte number obtained by multiplying the value of the payload length by two.

The header CRC is a checksum calculated from the value ranging from the sync frame indicator to the payload length.

Stored as the cycle count is the current cycle number.

The payload segment contains data representing the content of the frame. The payload segment stores a byte number twice the value of the payload length and 254 bytes at the maximum.

The trailer segment stores the CRC calculated from the values covering all of the frame.

1.4 Configuration Diagram of ECU 200a

Figure 4:
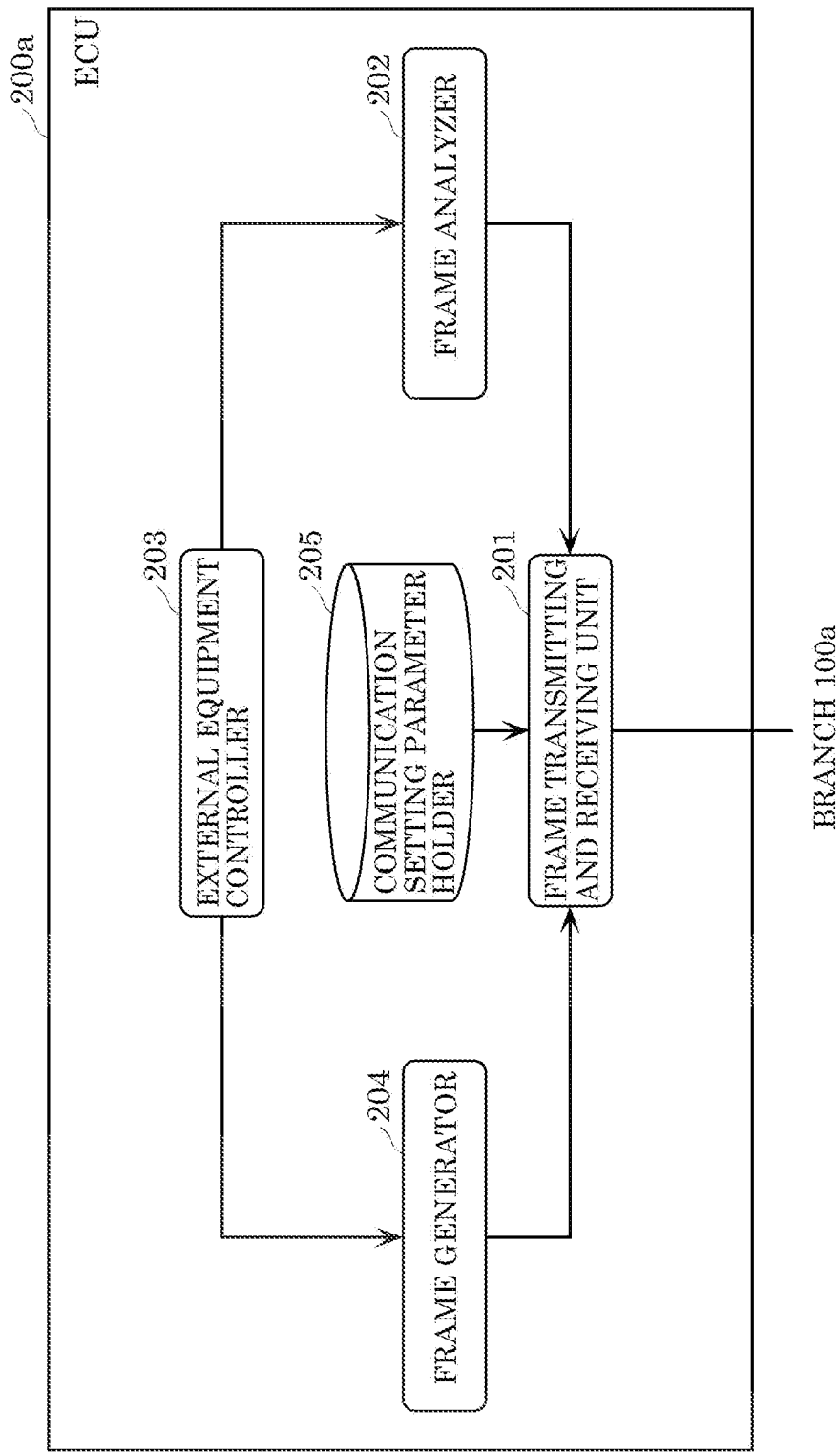
FIG. 4 shows a configuration of an ECU according to the embodiment.

FIG. 4 shows a configuration of ECU 200a according to this embodiment. Note that ECU 200b, ECU 200c, and ECU 200d have the same configuration as ECU 200a, and the explanation thereof will thus be omitted.

ECU 200a is connected to branch 100a and transmits/receives frames through branch 100a to achieve the control of steering wheel 210. As shown in FIG. 4, ECU 200a includes frame transmitting and receiving unit 201, frame analyzer 202, external equipment controller 203, frame generator 204, and communication setting parameter holder 205.

Frame transmitting and receiving unit 201 receives the frames flowing through branch 100a in the on-board network. More specifically, frame transmitting and receiving unit 201 decodes the physical signals contained in the frames received from branch 100a to digital signals to obtain the information on the frames. Frame transmitting and receiving unit 201 refers to the communication setting parameters held in communication setting parameter holder 205 to properly receive the frames in synchronization with the other ECUs.

In addition, frame transmitting and receiving unit 201 transmits the frames to branch 100a in the on-board network. More specifically, in accordance with a request for frame transmission notified of by frame generator 204, frame transmitting and receiving unit 201 converts the frames into physical signals at predetermined times and transmits the physical signals to branch 100a.

Frame analyzer 202 analyzes the respective payloads contained in the frames received by frame transmitting and receiving unit 201 and notifies external equipment controller 203 to control steering wheel 210 connected to ECU 200a in accordance with the content of the payload. Frame analyzer 202 determines the travel state based on the information on the vehicle speed notified of by another ECU, for example, to achieve assist control of the steering wheel according to the travel state or self-steering of the steering wheel based on steering instruction signals in a self-parking mode.

External equipment controller 203 controls steering wheel 210 connected to ECU 200a. In addition, external equipment controller 203 monitors the conditions of steering wheel 210 and notifies frame generator 204 of a request for frame transmission for notifying the other ECUs of the conditions. For example, external equipment controller 203 notifies frame generator 204 of a request for frame for notifying of the angle of steering wheel 210.

Frame generator 204 generates the frames based on the signals transmitted from external equipment controller 203 and requests frame transmitting and receiving unit 201 to transmit the frames.

Communication setting parameter holder 205 holds the parameters common within the cluster for properly converting physical signals into digital signals. Details of the communication setting parameters will be described later.

1.5 Configuration Diagram of Monitoring ECU 400a

Figure 5:
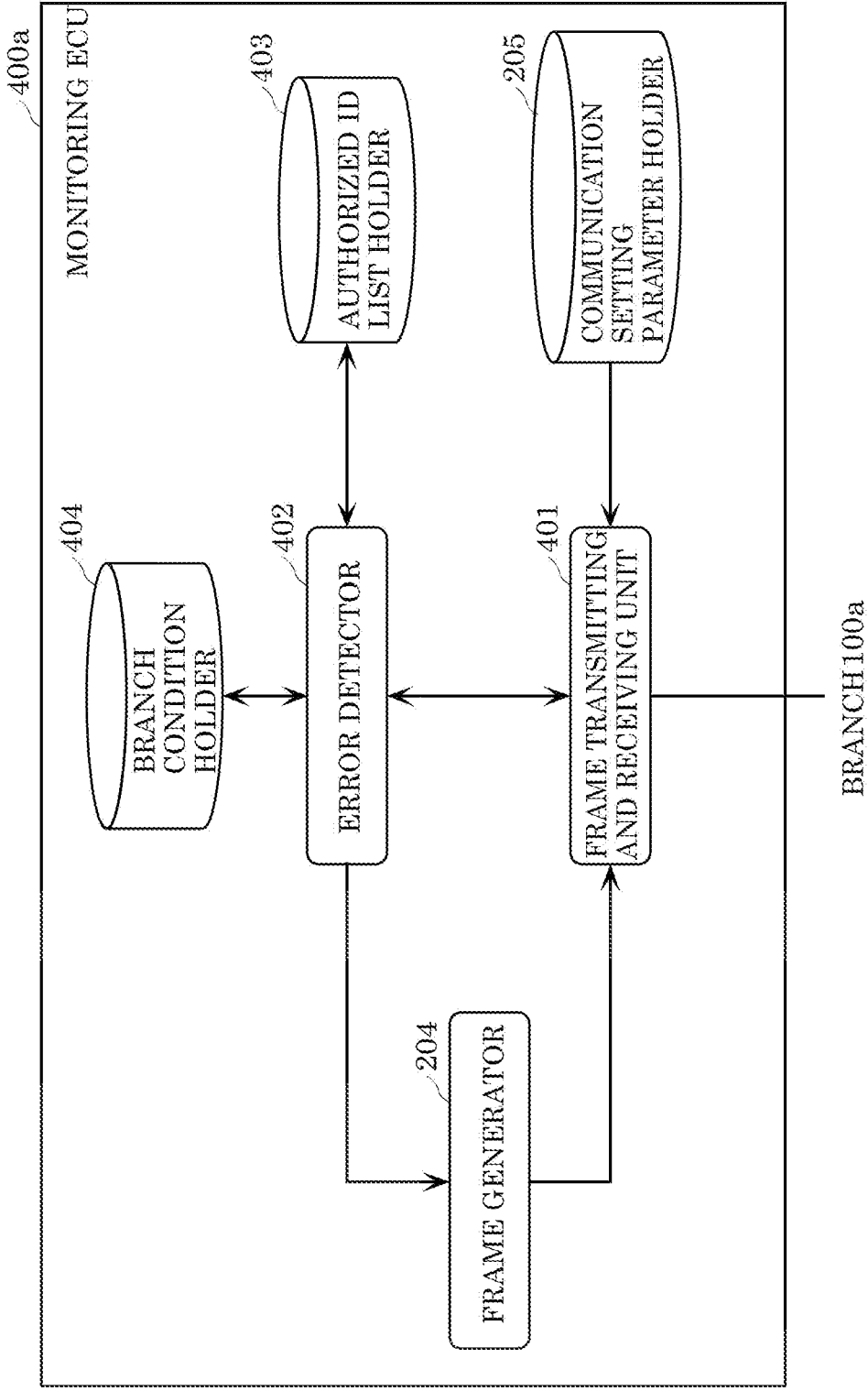
FIG. 5 shows an example configuration of a monitoring ECU according to the embodiment.

FIG. 5 shows an example configuration of monitoring ECU 400a according to this embodiment. Note that monitoring ECUs 400b, 400c, and 400d have the same configuration as monitoring ECU 400a, and the explanation thereof will thus be omitted. In the configuration of monitoring ECU 400a, the same reference marks as those of ECU 200a are used to represent equivalent elements, and the detailed explanation thereof will be omitted.

Monitoring ECU 400a is an example of the "error monitoring device" and an example of the "first error monitoring device" or the "second error monitoring device". Monitoring ECU 400a is connected to branch 100a. As described above, monitoring ECU 400a monitors branch 100a to detect transmission of unauthorized frames and invalidate the unauthorized frames. As shown in FIG. 5, monitoring ECU 400a includes frame generator 204, communication setting parameter holder 205, frame transmitting and receiving unit 401, error detector 402, authorized ID list holder 403, and branch condition holder 404. The same reference marks as those in FIG. 4 are used to represent equivalent elements.

Frame Transmitting and Receiving Unit 401

Frame transmitting and receiving unit 401 receives the frames flowing on the on-board network within the predetermined time slots of the on-board network, and transmits the frames within predetermined time slots of the on-board network to the on-board network. Frame transmitting and receiving unit 401 transmits and receives the frames to and from branch 100a in the on-board network. More specifically, frame transmitting and receiving unit 401 receives the frames flowing through branch 100a in the on-board network, and transmits the frames to branch 100a in the on-board network. Frame transmitting and receiving unit 401 decodes the physical signals contained in the frames received from branch 100a to digital signals to obtain the information on the frames. Frame transmitting and receiving unit 401 refers to the communication setting parameters held in communication setting parameter holder 205 to properly receive the frames in synchronization with the other ECUs. In accordance with a request for frame transmission notified of by frame generator 204, frame transmitting and receiving unit 401 converts the frames into physical signals at predetermined times and transmits the physical signals to branch 100a.

Frame transmitting and receiving unit 401 further transmits/receives, as the frames, error notification frames or mode transition frames, for example. The error notification frames are for notifying of the occurrence of errors in the received frames. The mode transition frames are for shifting associated one of target monitoring ECUs 400b and 400d to the invalidation mode. In accordance with the branch connected to monitoring ECU 400a, frame transmitting and receiving unit 401 determines the cycle numbers for transmitting the error notification frames or the mode transition frames.

Frame transmitting and receiving unit 401 also transmits/receives, as the frames, anomaly notification frames, for example. The anomaly notification frames are for notifying of the occurrence of anomalies in transmitting and receiving the mode transition frames or the error notification frames.

Error Detector 402

Upon notification by transmitting and receiving unit 401 of the frames received by frame transmitting and receiving unit 401, error detector 402 monitors whether the frames notified of are received without errors. Note that error detector 402 monitors whether errors occur in the frames based on what kind of flag is set to indicate any of a transmission (Tx) conflict, a synchronization (syntax) error, a content error, and a boundary violation defined by the FlexRay protocol.

Detecting an occurrence of an error in any of the frames received by frame transmitting and receiving unit 401, error detector 402 causes the ECUs present in the branches other than the own branch to transmit a frame with a specific ID for notifying of the occurrence of the error in the own branch. More specifically, error detector 402 notifies frame generator 204 of transmission of the frame with the specific ID for notifying of the occurrence of the error to cause frame transmitting and receiving unit 401 to transmit the frame.

More specifically, error detector 402 monitors whether an error occurs in any of the frames received by frame transmitting and receiving unit 401. Detecting an occurrence of an error in the frame received by frame transmitting and receiving unit 401, error detector 402 causes frame transmitting and receiving unit 401 to transmit an error notification frame containing the information identifying the type of the frame subjected to the error.

Receiving a mode transition frame to the invalidation mode or an anomaly notification frame, error detector 402 may cause frame transmitting and receiving unit 401 to transmit the frame with the ID to be invalidated for invalidating, in other branches 100a to 100c, the frames with the ID subjected to the error.

Specifically, assume that error detector 402 detects that no error notification frame for notifying of an occurrence of an error in own branch 100a is received from other monitoring ECU 400b to 400d with respect to the frame subjected to the error and included in the error notification frame transmitted by frame transmitting and receiving unit 401. In this case, error detector 402 may cause frame transmitting and receiving unit 401 to transmit the mode transition frame for shifting other monitoring ECU 400b to 400d to the invalidation mode. In addition, error detector 402 monitors whether an error occurs in the mode transition frame transmitted by frame transmitting and receiving unit 401. Detecting an occurrence of an error in the mode transition frame, error detector 402 causes frame transmitting and receiving unit 401 to transmit an anomaly notification frame for notifying of an occurrence of an anomaly in transmitting and receiving the mode transition frame.

Detecting that frame transmitting and receiving unit 401 has received a mode transition frame to the invalidation mode, error detector 402 may shift monitoring ECU 400a to the invalidation mode.

Detecting that frame transmitting and receiving unit 401 has received an anomaly notification frame, error detector 402 shifts monitoring ECU 400a to the invalidation mode.

Here, after the shift of monitoring ECU 400a to the invalidation mode, error detector 402 may invalidate the reception of the frame to be invalidated by causing frame transmitting and receiving unit 401 to not receive the frame to be invalidated. After the shift of monitoring ECU 400a to the invalidation mode, error detector 402 may invalidate the reception of the frame to be invalidated by causing frame transmitting and receiving unit 401 to transmit a frame with the same identifier as the frame to be invalidated in the same time slot as the frame to be invalidated. Assume that monitoring ECU 400a has shifted to the invalidation mode and frame transmitting and receiving unit 401 transmits a first frame within a predetermined time slot of the on-board network. In this case, error detector 402 may invalidate the reception of the frame to be invalidated by causing frame transmitting and receiving unit 401 to transmit the first frame at a transmission start time earlier than the predetermined transmission start time within the predetermined time slot.

Assume that error detector 402 detects no error in the own branch (branch 100a) with respect to the frame subjected to the error in one of the other branches and included in the error notification frame received by frame transmitting and receiving unit 401. In this case, error detector 402 may regard this frame as the frame to be invalidated and shift monitoring ECU 400a to the invalidation mode for invalidating the reception of the subsequent frames.

Assume that error detector 402 detects an occurrence of an error in one of the frames received by frame transmitting and receiving unit 401 and notifies of the occurrence of the error in the frames with the same ID in other branches 100b to 100d. In this case, error detector 402 may determine that there is a communication anomaly due to a malfunction or any other cause and cause a shift to a malfunction mode. In the "malfunction mode" here, the automatic control function of the drive assist function is turned off, that is, the frames related to the automatic control are invalidated.

Authorized ID List Holder 403

Authorized ID list holder 403 stores the list of the IDs of the frames to be transmitted by the ECUs. Details of the authorized ID list will be described later.

Branch Condition Holder 404

Branch condition holder 404 is held in monitoring ECU 400a and stores information on the branches present in the on-board network, the occurrence (status) of errors in the branches, the current mode, or other information. Details of the branch conditions stored in branch condition holder 404 will be described later.

1.6 Configuration Diagram of Star Coupler 300

Figure 6:
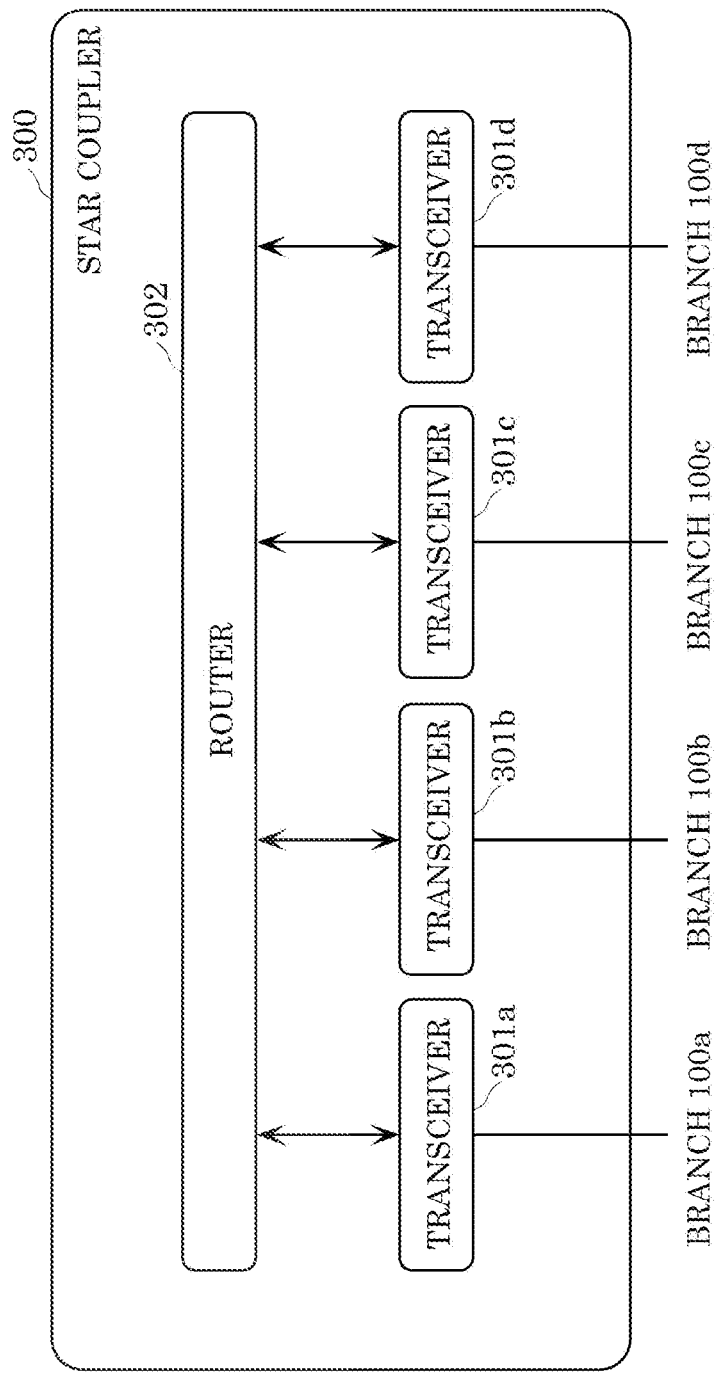
FIG. 6 shows a configuration of a star coupler according to the embodiment.

FIG. 6 shows a configuration of star coupler 300 according to this embodiment. Star coupler 300 is connected to branches 100a to 100d and shapes signals so that the same signals flow through branches 100a, 100b, 100c, and 100d as described above. Star coupler 300 transfers the frame that has started being transmitted earliest in the same time period (i.e., in the same slot) to all the branches other than the branch that has transmitted this frame. As shown in FIG. 6, star coupler 300 includes transceivers 301a, 301b, 301c, and 301d and router 302.

Transceiver 301a is connected to branch 100a, converts the physical signals received from branch 100a into digital signals, and transmits the digital signals to router 302. When digital signals are transmitted from router 302, transceiver 301a converts the transmitted digital signals into physical signals and transfers the physical signals to branch 100a.

Router 302 transfers the digital signals transmitted from transceiver 301a to transceivers 301b, 301c, and 301d other than transceiver 301a. Similarly, when digital signals are transmitted from transceiver 301b, router 302 transfers the digital signals to transceiver 301a, 301c, and 301d other than transceiver 301b. In this manner, router 302 transfers the frame transmitted from one of transceivers 301a, 301c, and 301d to the others of transceiver 301a, 301c, and 301d.

Receiving digital signals from at least two of the plurality of transceivers, router 302 transfers the signals from the transceiver that has transmitted the digital signals first to the other transceivers.

1.7 Example Communication Setting Parameters

FIG. 7 shows example communication setting parameters according to this embodiment.

As described above, the communication setting parameters are stored in communication setting parameter holders 205 of monitoring ECUs 400a to 400d and ECUs 200a to 200d. As shown in FIG. 7, the communication setting parameters include a baud rate representing the communication speed, slot IDs for the static segments, slot IDs for the dynamic segments, and a payload length of the static slots, for example. The communication setting parameters shown in FIG. 7 are as follows. The baud rate is 10 Mbps. The slot IDs for the static segments are from 1 to 50, whereas the slot IDs for the dynamic segments are 51 to 100. The payload length of the static slots is 8 (i.e., 16 bytes). The values of these communication setting parameters are shared by the ECUs inside the cluster. Based on these values, the transmission/reception of the FlexRay frames are achieved.

Note that the values of the communication setting parameters shown in FIG. 7 are mere examples and may be other values. The items of the communication setting parameters shown in FIG. 7 are also mere examples and may include the length of the segments and/or the length of slots, for example, or may exclude some of the parameters.

1.8 Example Authorized ID List

FIG. 8 shows an example authorized ID list for the static frames according to this embodiment. The authorized ID list for the static frames shown in FIG. 8 is stored in authorized ID list holder 403 held in monitoring ECU 400*a*.

As shown in FIG. 8, the authorized ID list for the static frames holds the slot IDs, cycle offsets, reception cycles, transmitter branch information, and payload information contained in the frames.

The cycle offset and the reception cycle are information necessary for extracting a target frame in using a method called "cycle multiplexing" of transmitting and receiving the frames with the same slot ID but different contents. For example, the frames with slot ID No. 3 shown in FIG. 8 has a cycle offset of 0 and a reception cycle of 2. This means that the cycle number starts with 0 and the frames are transmitted in every two cycles, namely, in cycle numbers 2, 4, . . . , and 62.

More specifically, in the authorized ID list shown in FIG. 8, the frames with slot ID No. 1 have a cycle offset of 0 and a reception cycle of 1, which indicates that the frames are transmitted in every cycle (i.e., cycle numbers 1, 2, . . . , 62). In addition, the list shows that the frames with slot ID No. 1 are transmitted by branch 100*b* and the payload includes the information on the speed. On the other hand, the cells for the frames with slot ID No. 2 are blank, which indicates that no frame with slot ID No. 2 is transmitted.

As described above, the frames with slot ID No. 3 have the cycle offset of 0 and the reception cycle of 2. This means that the cycle number starts with 0 and the frames are transmitted in every two cycles, namely, in cycle numbers 2, 4, . . . , and 62, that is, only the even numbers. The list further shows that the frames with slot ID No. 3 are transmitted by branch 100*a* and the payload includes the information on the steering wheel angle. Similarly, the frames with slot ID No. 4 have a cycle offset of 1 and a reception cycle of 2. This means that the cycle number starts with 1 and the frames are transmitted in every two cycles, namely, in cycle numbers 3, 5, . . . , 61, that is, only the odd numbers. The list further shows that the frames with slot ID No. 4 are transmitted by branch 100*b* and that the payload includes the information on the gear stage.

The list shows that the frames with slot ID No. 5 have a cycle offset of 0 and a reception cycle of 1 and are transmitted by branch 100*b* and the payload includes the information on the brake hydraulic pressure. The list shows that the frames with slot ID No. 6 have a cycle offset of 2 and a reception cycle of 4 and are transmitted by branch 100*d* and that the payload includes the information on steering instructions.

FIG. 9 shows an example authorized ID list for the dynamic frames according to this embodiment. The authorized ID list for the dynamic frames shown in FIG. 9 is stored in authorized ID list holder 403 held in monitoring ECU 400*a*. The authorized ID list for the dynamic frames shown in FIG. 9 includes the same information as in FIG. 8, namely, the slot IDs, the cycle offsets, the reception cycles, the transmitter branch information, and the payload information contained in the frames.

The authorized ID list for the dynamic frames in FIG. 9 shows frames (i.e., dynamic frames) with slot ID No. 51 each including four (types of) frames.

The list shows that first frames have a cycle offset of 1 and a reception cycle of 8 and are transmitted by branch 100*a*. In addition, the payload includes the information indicating that each of the first frames is for notifying of an occurrence of an error in a frame with ID No. 1 in branch 100*a*. Similarly, second frames have a cycle offset of 2 and a reception cycle of 8 and are transmitted by branch 100*b*. In addition, the payload includes the information indicating that each of the second frame is for notifying of an occurrence of an error in a frame with ID No. 1 in branch 100*b*. The list shows that third frames have a cycle offset of 3 and a reception cycle of 8 and are transmitted by branch 100*c*. In addition, the payload includes the information indicating that each of the third frames is for notifying of an occurrence of an error in a frame with ID No. 1 in branch 100*c*. The list shows that fourth frames have a cycle offset of 4 and a reception cycle of 8 and are transmitted by branch 100*d*. In addition, the payload includes the information indicating that each of the fourth frames is for notifying of an occurrence of an error in a frame with ID No. 1 in branch 100*d*.

In this manner, in the frames with slot ID No. 51, the cycle offsets are variable for the single slot ID to change the transmitter branches.

The authorized ID list for the dynamic frames shown in FIG. 9 shows that the frames with slot ID No. 53 have a cycle offset corresponding to the transmitter branch and a reception cycle of 8 and transmitted by all the branches. In addition, the payload includes the information indicating that the frames with slot ID No. 53 are for notifying of the occurrence of the errors in the frames with ID No. 3 in all the branches.

The list also shows that the frames with slot ID No. 56 also have a cycle offset corresponding to the transmitter branch and a reception cycle of 8 and transmitted by all the branches. In addition, the payload includes the information indicating that the frames with slot ID No. 56 are for notifying of the occurrence of the errors in the frames with ID No. 6 in all the branches. That is, the frames with slot ID No. 56 are error notification frames.

The list further shows that the frames with slot ID No. 100 have a cycle offset corresponding to the transmitter branch and a reception cycle of 8 and transmitted by all the branches. The list further shows that the payload includes notification of an occurrence of an anomaly in the error notification frames. That is, the frames with slot ID No. 100 are anomaly notification frames.

1.9 Example Branch Conditions

FIG. 10 shows example branch conditions according to this embodiment. The branch conditions shown in FIG. 10 are stored in branch condition holder 404 of monitoring ECU 400*a*.

According to the branch conditions shown in FIG. 10, monitoring ECU 400*a* is present in branch 100*a* and in a normal mode. FIG. 10 shows, as the branch conditions, the frames with slot ID No. 1 as follows. The number (i.e., number of times of reception) of frames subjected to an error is used in the own branch, whereas the number (i.e., number of times) of receptions of an error notification frame is used in the other branches. In the example shown in FIG. 10, with respect to the frames with slot ID No. 1, an error has occurred 0 times in branch 100*a*, whereas branch 100*b*, branch 100*c*, and branch 100*d* have received an error notification frame 0 times from the other branches. Similarly, the example shows that, with respect to the number of the frames with slot ID No. 3, an error has occurred 10 times in branch 100*a*, whereas branch 100*b*, branch 100*c*, and branch 100*d* have received an error notification frame 0 times.

1.10 Example Error Notification Frame and Example Anomaly Notification Frame

FIG. 11A shows an example error notification frame according to this embodiment. FIG. 11A shows an error notification frame with slot ID No. 56 for notifying of an error in a frame with slot ID No. 6 described with reference to FIG. 9. The error notification frame is a dynamic frame under the FlexRay protocol.

The error notification frame shown in FIG. 11A is transmitted in a cycle of 17 and with a payload of 0x01010100. The first byte 0x01 of the payload represents the branch transmitting the error notification frame. The byte 0x01 indicates that branch 100a has transmitted the frame. The second byte of the payload represents the content of the frame with slot ID No. 56. The byte 0x01 indicates that the frame is an error notification frame. If the second byte has a value of 2, the frame is for requesting a mode change of the other monitoring ECUs. In this embodiment, the frame is a mode transition frame causing a shift to the invalidation mode. The third byte of the payload represents error information. The byte 0x01 indicates an occurrence of a syntax error. The fourth byte of the payload represents mode change information. The byte 0x00 indicates the normal mode.

From that fact that the frame with slot ID No. 56 (i.e., the error notification frame) has a cycle of 17, it is found that branch 100a has transmitted the frame. This is for allowing the monitoring ECUs to precisely grasp an occurrence of an error in a frame with a specific ID based only on the slot ID and the cycle information, even if an unauthorized ECU spoofs and transmits the payload of an error notification frame.

In other words, in a normal state (i.e., at a normal time) without any error, no frame with slot ID No. 56 (i.e., no error notification frame) is transmitted/received. On the other hand, at an occurrence of an error in a frame with slot ID No. 6, a frame with slot ID No. 56 (i.e., an error notification frame) is transmitted. Accordingly, upon receipt of the frame with slot ID No. 56, the monitoring ECUs grasp the occurrence of the error in the frame with slot ID No. 6 regardless of the payload value of the frame.

FIG. 11B shows an anomaly notification frame according to this embodiment. FIG. 11B shows an anomaly notification frame with slot ID No. 100 described above with reference to FIG. 9. The anomaly notification frame has been transmitted at an occurrence of an anomaly in transmitting and receiving (i.e., communications of) an error notification frame (or a mode transition frame to the invalidation mode). For example, the anomaly includes the case where the error notification frame has an error and is not transmitted or where a monitoring ECU receives an error notification frame to be transmitted from the monitoring ECU itself, although no error notification frame is transmitted.

The anomaly notification frame shown in FIG. 11B has slot ID No. 100, a cycle of 1, and a payload of 0x01010038. The first byte of the payload represents the transmitter branch. The byte 0x01 indicates that branch 100a is the transmitter branch. It means that the anomaly notification frame shown in FIG. 11B is transmitted by branch 100a. The second byte of the payload represents an anomaly code. The byte 0x01 indicates a failure in transmitting an error notification frame. The two of the third and fourth bytes of the payload represent the slot ID of the error notification frame subjected to the anomaly in error notification. The byte 0x38 indicates an occurrence of an anomaly in an error notification frame with slot ID No. 56 in a decimal number.

Like the error notification frames, no anomaly notification frame is transmitted/received at a normal time (i.e., in the normal state without any error). On the other hand, at an occurrence of an anomaly in transmitting and receiving an error notification frame (or a mode transition frame to the invalidation mode), an anomaly notification frame is transmitted. Upon receipt of the anomaly notification frame, the monitoring ECUs shift to the invalidation mode based on the anomaly notification frame.

1.11 Operation of Monitoring ECU 400a

Figure 12:
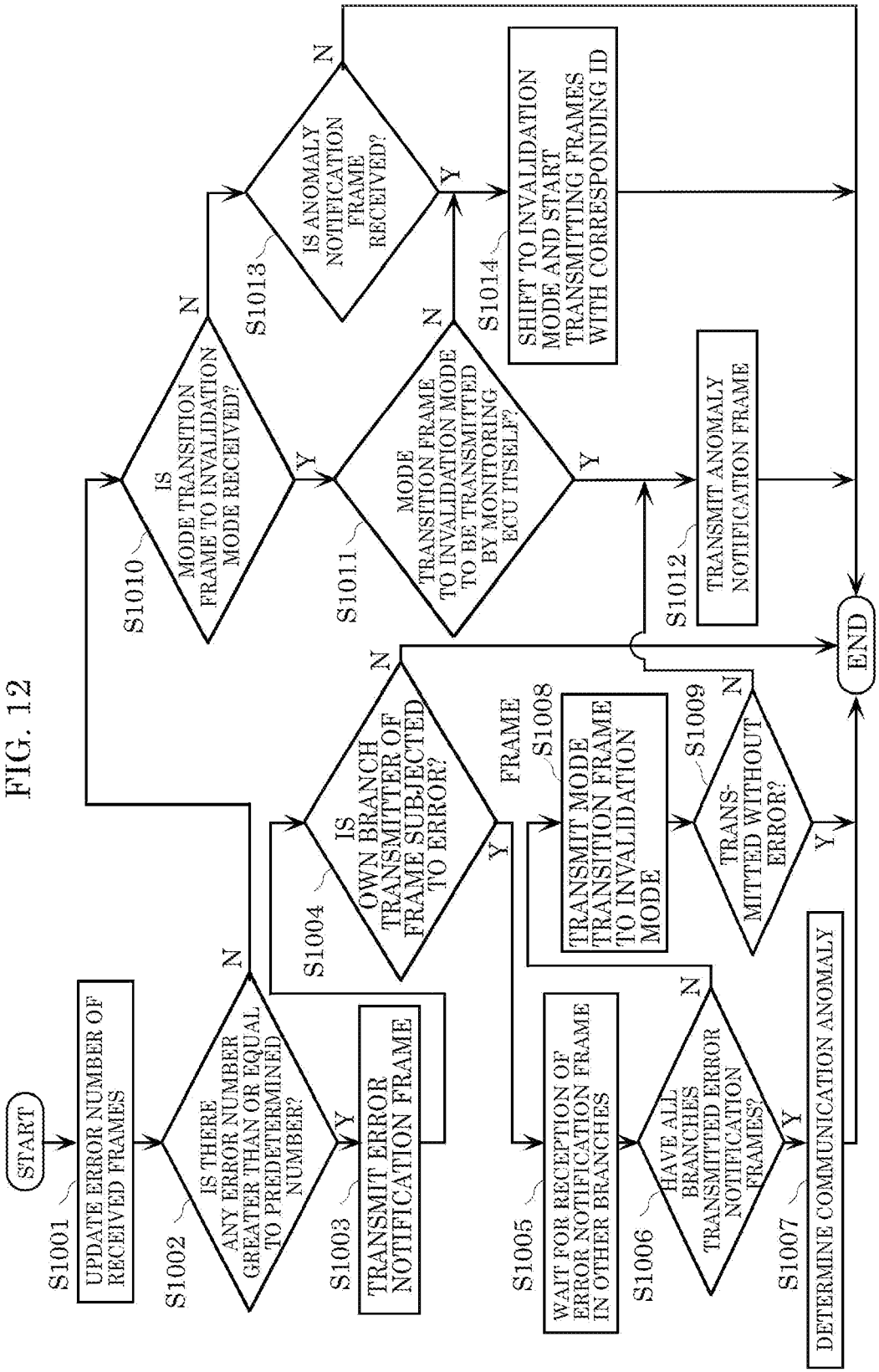
FIG. 12 is a flowchart showing processing of the monitoring ECU according to the embodiment.

FIG. 12 is a flowchart showing processing monitoring ECU 400a according to this embodiment.

Monitoring ECU 400a receives the frames flowing through branch 100a. Detecting an occurrence of an error in one of the received frames, monitoring ECU 400a updates the error number of the slot ID associated with the frame (S1001).

Next, monitoring ECU 400a checks whether there is an error number for a slot ID, for example, in the branch conditions shown in FIG. 10, which is greater than or equal to a predetermined number such as 10 (S1002).

If there is an error number greater than or equal to the predetermined number in step S1002 (Y in S1002), monitoring ECU 400a transmits an error notification frame to branch 100a (S1003).

Then, monitoring ECU 400a checks whether the own branch is the transmitter of the frame in which the occurrence of the error is detected (i.e., the frame subjected to the error) (S1004). Here, monitoring ECU 400a can check whether the own branch (i.e., branch 100a) is the transmitter of the frame based on the slot ID associated with the frame subjected to the error.

If the own branch is the transmitter of the frame subjected to the error in step S1004 (Y in S1004), monitoring ECU 400a waits for reception of the error notification frame in the other branches (i.e., branches 100b to 100d) by one cycle (i.e., the period of 1 slot unit) (S1005). If the own branch is not the transmitter of the frame subjected to the error in step S1004 (N is S1004), monitoring ECU 400a ends the processing.

After that, monitoring ECU 400a checks whether all branches 100a to 100c have transmitted error notification frames for notifying of the occurrence of the error in the frames with the associated slot ID (S1006).

Confirming in step S1006 that all the branches have transmitted the error notification frames (Y in S1006), monitoring ECU 400a determines that there is a communication anomaly in the on-board network system (S1007), shifts to the malfunction mode, and ends the processing.

On the other hand, confirming in step S1006 that not all the branches have transmitted the error notification frames (N in S1006), monitoring ECU 400a determines that the other branches transmit unauthorized frames and transmits a mode transition frame to the invalidation mode (S1008).

Next, monitoring ECU 400a checks whether the mode transition frame has been transmitted without any error (S1009).

Confirming in step S1009 that the mode transition frame has been transmitted without any error (Y in S1009), monitoring ECU 400a ends the processing.

On the other hand, confirming in step S1009 that the mode transition frame has failed to be transmitted without any error (N in S1009), monitoring ECU 400a determines that the other branches transmit unauthorized frames and transmits an anomaly notification frame (S1012).

If there is no error number that is greater than or equal to the predetermined number in step S1002 (N in S1002), monitoring ECU 400a checks whether a mode transition frame to the invalidation mode has been received (S1010).

Confirming in step S1010 that the mode transition frame has been received (Y in S1010), monitoring ECU 400a checks whether the received mode transition frame is the frame to be transmitted by monitoring ECU 400a itself (S1011).

Confirming in step S1011 that the mode transition frame to be transmitted by monitoring ECU 400a itself has been received (Y in S1011), monitoring ECU 400a determines that the other branches transmit unauthorized frames and transmits an anomaly notification frame (S1012).

On the other hand, confirming in step S1011 that no mode transition frame to be transmitted by monitoring ECU 400a itself has been received (N in S1011), monitoring ECU 400a shifts to the invalidation mode and starts transmitting the frames with the corresponding (i.e., the same) ID (S1014). Accordingly, monitoring ECU 400a transmits the frames with the same slot ID as the unauthorized frames to cause a collision with the unauthorized frames, which allows invalidation of the unauthorized frames.

Confirming in step S1010 that no mode transition frame has been received (N in S1010), monitoring ECU 400a checks whether an anomaly notification frame has been received (S1013).

Confirming in step S1013 that no anomaly notification frame has been received (N in S1013), monitoring ECU 400a ends the processing. Confirming in step S1013 that the anomaly notification frame has been received (Y in S1013), monitoring ECU 400a shifts to the invalidation mode and starts transmitting the frames with the corresponding (i.e., the same) ID (S1014). Here, monitoring ECU 400a starts transmitting, as the frames with the corresponding (i.e., the same) ID, the frames with slot IDs for which an error notification frame has been received not 0 times as stored in branch condition holder 404. Accordingly, monitoring ECU 400a transmits the frames with the same slot ID as the unauthorized frames to cause a collision with the unauthorized frames, which allows invalidation of the unauthorized frames.

1.12 Overall Sequence Diagram

Now, an overall sequence of the anti-fraud control system according to this embodiment will be described with reference to FIGS. 13A and 13B.

Figure 13A:
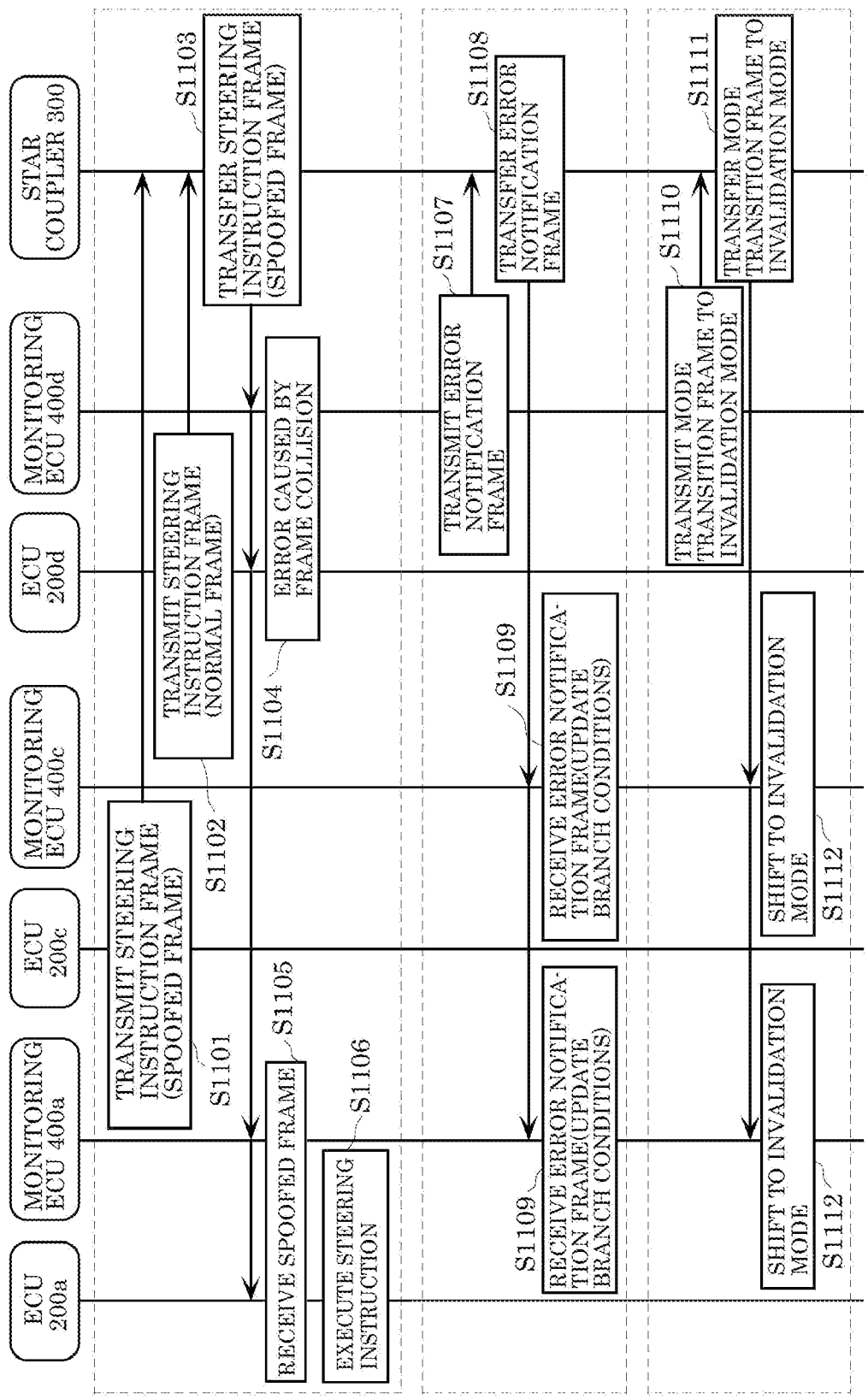
FIG. 13A shows an example operation sequence after an attacker has taken control of the ECU according to this embodiment and until the monitoring ECU shifts to an invalidation mode.

FIG. 13A shows an example operation sequence diagram after an attacker has taken control of an ECU according to this embodiment and until the monitoring ECU shifts to the invalidation mode. FIG. 13B shows an example operation sequence after the attacker has taken control of the ECU according to this embodiment and the monitoring ECU has shifted to the invalidation mode. Note that each area surrounded by a dotted line represents one slot unit, that is, the period of the same slot ID. None of FIGS. 13A and 13B shows monitoring ECU 400b. Monitoring ECU 400b operates similarly to monitoring ECUs 400a, 400c, and 400d and the explanation thereof will thus be omitted for the sake of simplicity.

First, the attacker takes control of ECU 200c via external communication module 230. ECU 200c whose control is taken by the attacker transmits an unauthorized steering instruction frame (i.e., a spoofed frame) to ECU 200a, attempting to cause fraud steering.

As shown in FIG. 13A, ECU 200c whose control is taken away then transmits the steering instruction frame (i.e., the spoofed frame) (S1101).

Next, ECU 200d whose control is not taken by any attacker (i.e., an authorized ECU) transmits a steering instruction frame as a normal frame. More specifically, authorized ECU 200d transmits the steering instruction frame (i.e., the normal frame) with a little delay from ECU 200c (S1102).

After that, star coupler 300 transfers the frame that has started being transmitted earliest among the frames transmitted in the period of the same slot ID, and thus transfers, to other branches 100a and 100d, the steering instruction frame (i.e., the spoofed frame), that is, the unauthorized frame that has started being transmitted earlier (S1103).

In branch 100d connected to ECU 200d, the spoofed frame transferred from star coupler 300 collides with the normal frame transmitted by ECU 200d, thereby causing an error (S1104). Here, monitoring ECU 400d detects the occurrence of the error caused by the frame collision.

On the other hand, branch 100a connected to ECU 200a receives the steering instruction frame (i.e., the spoofed frame) that is the unauthorized frame (S1105). Here, ECU 200a and monitoring ECU 400a receive the steering instruction frame (i.e., the spoofed frame).

Next, ECU 200a executes a steering instruction based on the steering instruction frame (i.e., the spoofed frame) that is the unauthorized frame (S1106). This causes fraud control of the vehicle.

In the period of the next slot unit, first, monitoring ECU 400d transmits an error notification frame based on the error that has occurred in branch 100d (S1107). Specifically, monitoring ECU 400d detects the occurrence of the error in the received frame and thus transmits the error notification frame. Monitoring ECU 400d waits for the reception of error notification frames from other branches 100a and 100c until the end of the period of the current slot unit (i.e., by the cycle).

After that, star coupler 300 transfers the error notification frame to other branches 100a and 100c (S1108).

Next, monitoring ECUs 400a and 400c receive the error notification frame flowing through branches 100a and 100c and update the branch conditions inside (S1109). Note that monitoring ECUs 400a and 400c transmit no error notification frame, since there is no error number for a slot ID that is greater than or equal to the predetermined number under the updated branch conditions.

In the period of the next slot unit, first, monitoring ECU 400d determines that other branches 100a and 100c receive unauthorized frames, since none of other branches 100a and 100c has transmitted an error notification frame. Monitoring ECU 400d transmits then a mode transition frame to the invalidation mode (S1110).

After that, star coupler 300 transfers the mode transition frame to branches 100a and 100c (S1111).

Monitoring ECUs 400a and 400c then receive the mode transition frame and shift to the invalidation mode (S1112), since the received mode transition frame is not to be transmitted by the monitoring ECUs themselves. Shifting to the invalidation mode, monitoring ECUs 400a and 400c transmit a steering instruction frame (i.e., an invalidation frame) as a frame with the slot ID obtained by the mode transition frame in the period of the next slot unit. Note that the slot ID obtained by the mode transition frame corresponds to the same slot ID as the unauthorized frames.

Figure 13B:
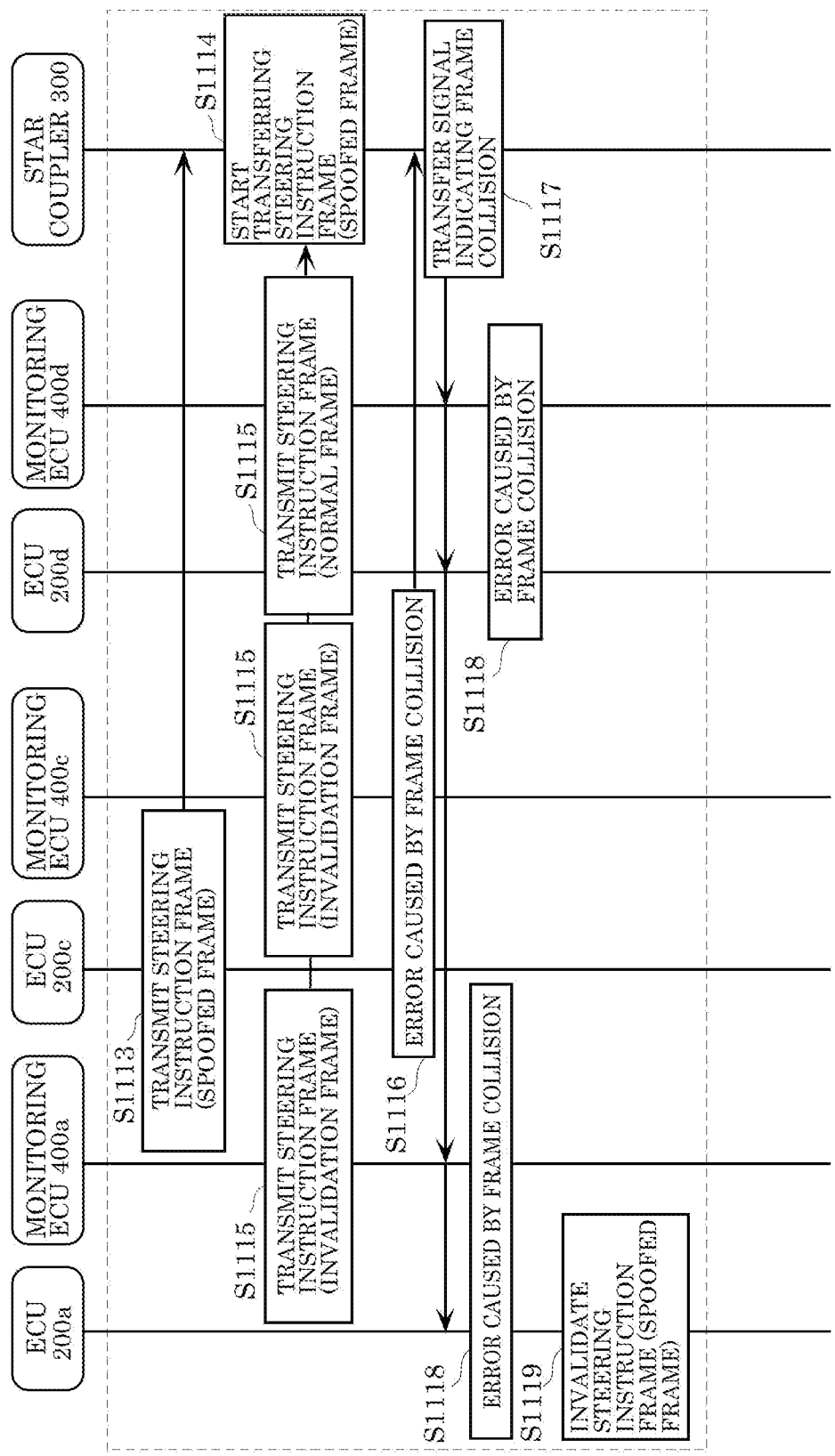
FIG. 13B shows an example operation sequence after the attacker has taken control of the ECU according to this embodiment and the monitoring ECU has shifted to the invalidation mode.

Assume that, in the period of the next slot unit, first, ECU 200c transmits an unauthorized steering instruction frame (i.e., a spoofed frame) again as shown in FIG. 13B (S1113).

Star coupler 300 then starts transferring the steering instruction frame (i.e., the spoofed frame) that is the unauthorized frame (S1114).

Here, monitoring ECUs 400a and 400c, which have shifted to the invalidation mode, transmit a steering instruction frame (i.e., an invalidation frame), whereas monitoring ECU 400d (or ECU 200d) transmits a steering instruction frame (i.e., a normal frame) (S1115).

In branch 100c, the spoofed frame that has already started being transmitted collides with the invalidation frame transmitted by monitoring ECU 400c, thereby causing an error (S1116).

Star coupler 300 then transfers, to other branches 100d and 100a, a signal indicating the frame collision (S1117).

In branches 100a and 100d, the signal transferred by star coupler 300 collides with an invalidation frame flowing through branch 100a and normal frame flowing through branch 100d, thereby causing errors (S1118).

Next, since there is the error in the steering instruction frame (i.e., the spoofed frame) that has started being transferred in step S1114, ECU 200a regards the frame, namely, the steering instruction frame as being invalid (S1119). In this manner, no fraud steering wheel control occurs in the vehicle.

1.13 Sequence Diagram in Spoofing Mode Transition Frame

Now, a sequence of spoofing a mode transition frame to the invalidation frame to be transmitted by a monitoring ECU will be described.

Figure 14A:
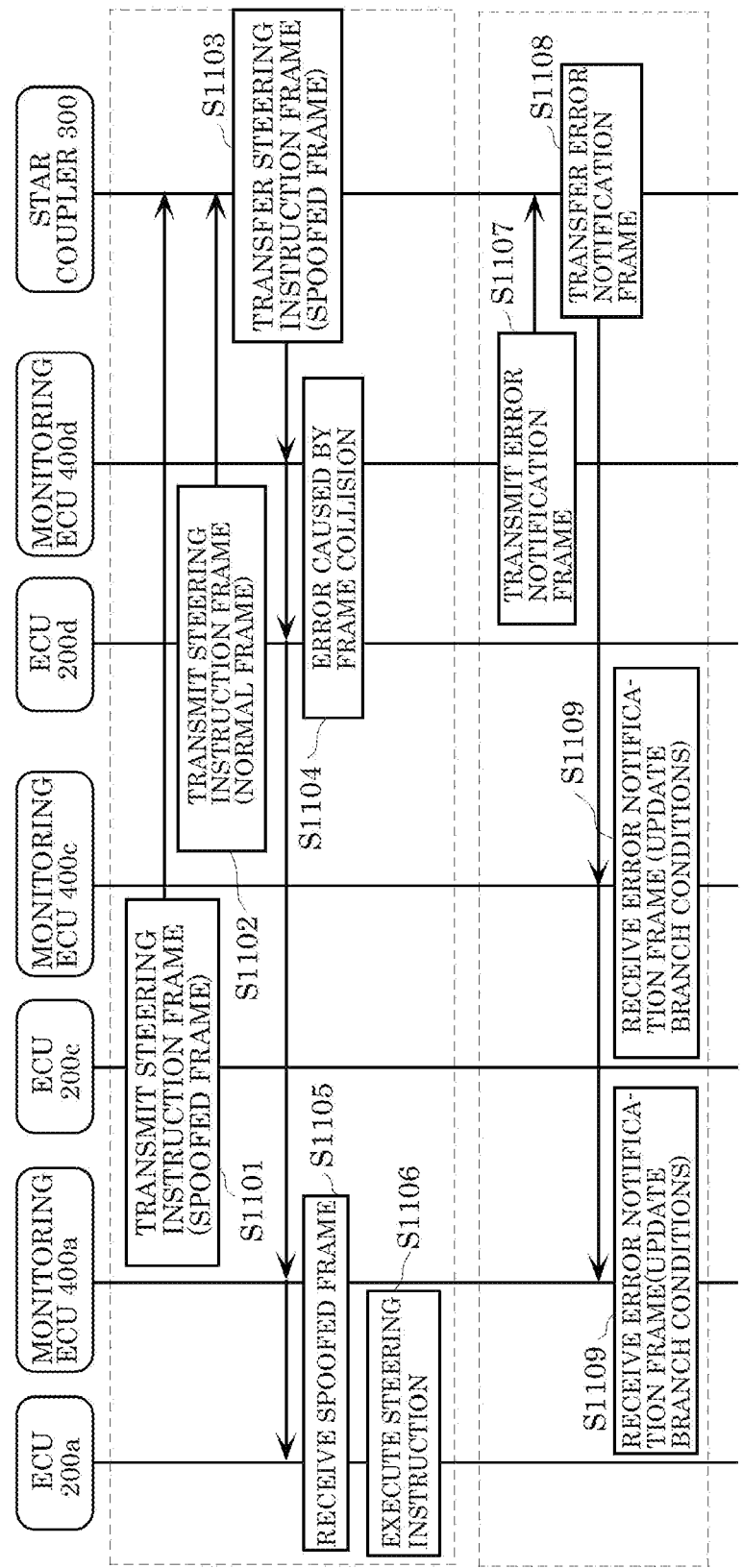
FIG. 14A shows an example operation sequence after an attacker has taken control of the ECU according to the embodiment and until the monitoring ECU transmits a mode transition frame to the invalidation mode.
Figure 14B:
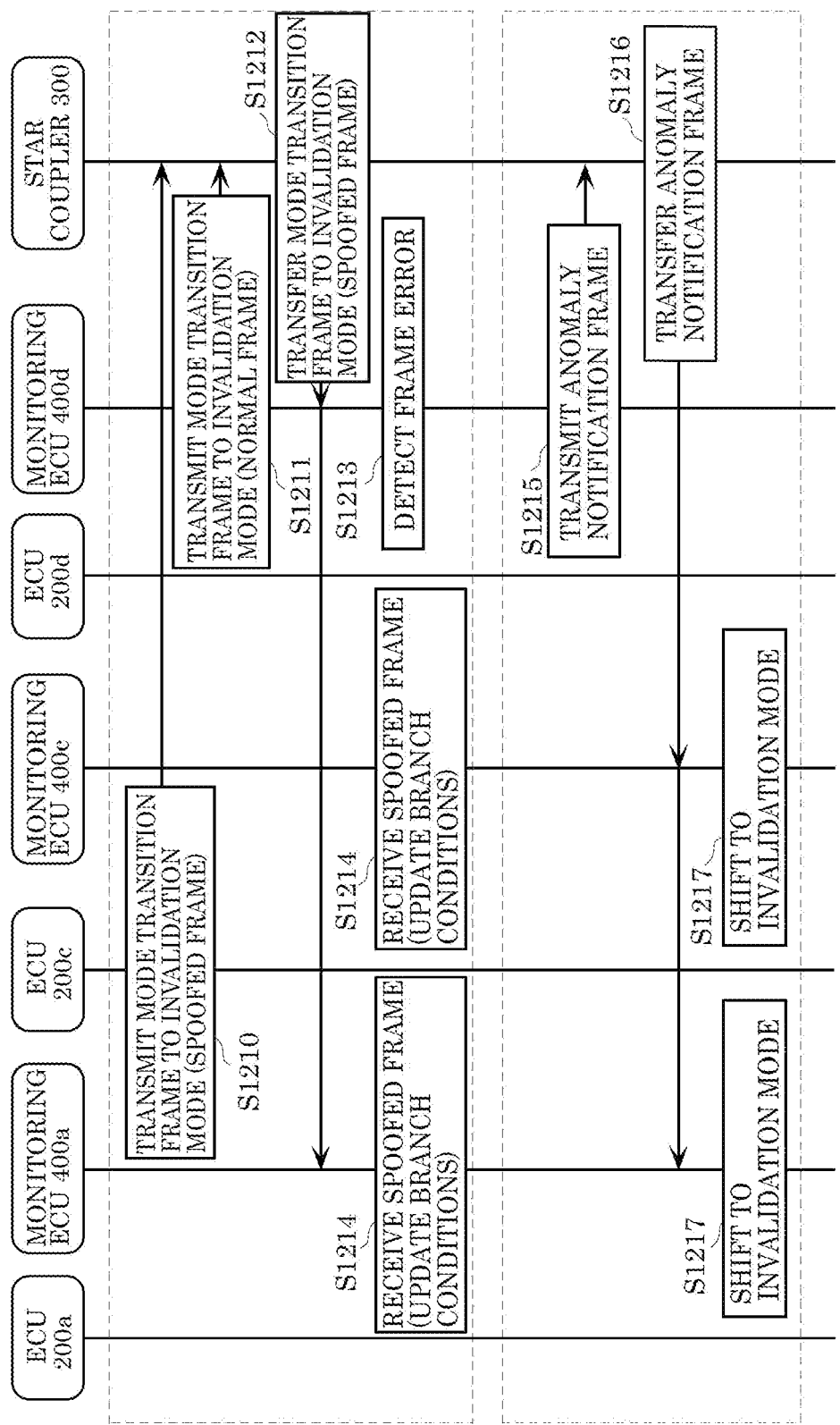
FIG. 14B shows an example operation sequence when the mode transition frame to be transmitted by the monitoring ECU according to the embodiment is spoofed.

FIG. 14A shows an example operation sequence diagram after an attacker has taken control of an ECU according to this embodiment and until the monitoring ECU transmits a mode transition frame to the invalidation mode. FIG. 14B shows an example operation sequence diagram when the mode transition frame to be transmitted by the monitoring ECU according to this embodiment is spoofed. The same reference marks as those in FIG. 13A are used to represent equivalent elements, and the detailed explanation thereof will be omitted. Specifically, steps S1101 to 2201 in FIG. 14A are the same as in FIG. 13A, and the detailed explanation thereof will be omitted.

FIG. 14B shows the sequence where the mode transition frame is also spoofed by ECU 200c and the monitoring ECUs cannot properly shift to the invalidation mode unlike in FIG. 13B.

Specifically, as shown in FIG. 14B, assume that ECU 200c transmits a mode transition frame to the invalidation mode (i.e., a spoofed frame) to not shift other monitoring ECUs 400a and 400d to the invalidation mode (S1210).

Next, monitoring ECU 400d transmits a mode transition frame to the invalidation mode as a normal frame. More specifically, monitoring ECU 400d transmits the mode transition frame (i.e., the normal frame) to shift other monitoring ECUs 400a and 400c to the invalidation mode with a little delay (S1211).

Then, star coupler 300 transfers the mode transition frame (i.e., the spoofed frame), that is, the unauthorized frame that has started being transmitted earlier (S1212).

In branch 100d connected to monitoring ECU 400d, the mode transition frame (i.e., the normal frame) transmitted by monitoring ECU 400d collides with the mode transition frame (i.e., the spoofed frame) that is the transferred unauthorized frame, thereby causing an error. Monitoring ECU 400d detects then the occurrence of the error caused by the frame collision, that is, the frame error (S1213).

Monitoring ECUs 400a and 400c receive the mode transition frame (i.e., the spoofed frame) that is the unauthorized frame (S1214). Receiving the spoofed frame, monitoring ECUs 400a and 400c do not shift to the invalidation mode but update the branch conditions. Here, being the unauthorized frame, the mode transition frame itself is transmitted as a frame with the same slot ID as the frame in which an error is detected by the management ECU of another branch. Accordingly, monitoring ECUs 400a and 400c can detect that an error is caused by the received spoofed frame and thus updates the branch conditions upon receipt of the spoofed frame.

In the period of the next slot unit, first, monitoring ECU 400d transmits an anomaly notification frame (S1215). More specifically, monitoring ECU 400d has failed to transmit the mode transition frame (i.e., the normal frame) without any error in the period of the previous slot unit, and thus transmits the anomaly notification frame.

After that, star coupler 300 transfers the anomaly notification frame to other branches 100a and 100c (S1216).

Receiving the anomaly notification frame flowing through branches 100a and 100c, monitoring ECUs 400a and 400c then shift to the invalidation mode (S1217).

In this manner, even if a mode transition frame to the invalidation mode is spoofed by an unauthorized ECU, each monitoring ECU shifts to the invalidation mode to invalidate spoofed frames (i.e., unauthorized frames).

Although not described, even if an error notification frame or an anomaly notification frame are spoofed by an unauthorized ECU, each monitoring ECU similarly shifts to the invalidation mode to perform the invalidation.

2. Advantageous Effects

As described above, the anti-fraud control system and the anti-fraud control method according to the present disclosure allow invalidation of transmission of unauthorized frames in the on-board network under the time-triggered communication protocol based on the time slots. More specifically, the anti-fraud control system, for example, according to the present disclosure detects the transmission of an unauthorized frame based on the mismatch in the error occurrence (status) in the on-board network. Detecting the transmission of an unauthorized frame, the system invalidates the reception of subsequent unauthorized frames to allow invalidation of transmission of the unauthorized frames. In this manner, the fail-safe function is achieved to improve the safety of the on-board network.

Here, as an invalidation technique, a frame with the same identifier as an unauthorized frame is transmitted in the same time slot as the unauthorized frame to invalidate the reception of unauthorized frames. That is, a frame with the same slot ID as the unauthorized frame is transmitted to cause a collision between the frames for the invalidation. This allows proper invalidation of unauthorized frames, which improves the safety of the on-board network.

As an invalidation technique, no unauthorized frame may be received, for example, a frame with a certain ID is ignored upon receipt to invalidate the transmission of unauthorized frames in the on-board network. Authorized frames may start being transmitted earlier than unauthorized frames to reduce the influence of the unauthorized frames. Specifically, authorized ECUs start transmitting frames earlier so that the star coupler transfers the frames transmitted by the authorized ECUs. In this manner, transmission of unauthorized frame may be invalidated in the on-board network.

The anti-fraud control system and the anti-fraud control method according to the present disclosure allows invalidation of unauthorized frames, even if a frame notifying of an error is replaced with an unauthorized frame. Accordingly, the safety of the on-board network improves.

The time-triggered communication protocol based on time slots is, for example, star FlexRay. Thus, the anti-fraud control system and the anti-fraud control method according to the present disclosure allow transmission/reception of error notification frames while utilizing slot IDs efficiently. Accordingly, unauthorized frames are invalidated properly while maintaining the flexibility in designing the on-board network, which improves the safety.

Other Variations (1) An example has been described above in the embodiment where the on-board network under the time-triggered communication protocol based on time slots is achieved by the star network topology. The configuration is however not limited thereto. The on-board network may be achieved by a bus type network topology or a hybrid of the bus and star network topologies. Note that the bus network topology effectively invalidates frames transmitted by an ECU whose control is taken away.

(2) In the embodiment described above, the error detectors are present in the monitoring ECUs only. The configuration is however not limited thereto. The error detectors may be present in the ECUs. This allows the EUCs themselves to detect errors in frames and thus reduce the control based on unauthorized frames. There is also no need to provide extra monitoring ECUs, leading to the advantages of reducing the space, power consumption, and costs of the on-board network. In addition, in each branch, the associated ECU monitors the range of the frames to be received originally. There is no need for a single monitoring ECU to monitor all the frames flowing through the inside of the branches, which is advantages in balancing processing loads.

(3) In the embodiment described above, each branch is associated with one of the monitoring ECU. The configuration is however not limited thereto. At least two monitoring ECUs (i.e., first and second error monitoring ECUs) may be associated with different branches in the on-board network.

For example, the monitoring ECU is a monitoring device in an on-board network under a time-triggered communication protocol based on time slots. The on-board network is connected to, for one of branches, one or more electronic control devices each transmitting and receiving a frame within a predetermined time slot. The monitoring device is provided for each of the branches and includes: a frame transmitting and receiving unit that receives an error notification frame transmitted for notifying of an occurrence of an error in the frame flowing on the on-board network and containing information identifying a type of the frame subjected to the error at the occurrence of the error in the frame; and an error detector that regards, as a frame to be invalidated, the frame subjected to the error and included in the error notification frame received, and shifts the monitoring device to an invalidation mode for invalidating reception of subsequent frames, if no error is detected in an own branch with respect to the frame.

In the monitoring ECU, the frame transmitting and receiving unit receives the frame flowing on the on-board network. The error detector monitors whether an error occurs in a first frame received by the frame transmitting and receiving unit and causes the frame transmitting and receiving unit to transmit a first error notification frame when detecting an occurrence of an error in the first frame received by the frame transmitting and receiving unit. The first error notification frame contains information identifying a type of the first frame subjected to the error and for notifying of the occurrence of the error in the first frame.

(4) In the embodiment described above, each monitoring ECU transmits a mode transition frame to the invalidation mode based on error detection conditions of the frame. The configuration is however not limited thereto. The monitoring ECU may transmit a mode transition frame to the invalidation mode regardless of the error detection conditions of the frame.

For example, assume that a frame contains an unauthorized message verification code or that a frame is determined as being unauthorized based on a predetermined anomaly detection technique. A monitoring ECU may transmit a mode transition frame for invalidating frames with the ID. This allows invalidation of unauthorized frames, even if the transmitter ECU whose control is directly taken by an attacker transmits the unauthorized frame without detecting an error. Accordingly, the safety further improves.

(5) In the embodiment described above, the dynamic frames are assigned to serve as the error notification frames, the mode transition frames to the invalidation mode, and the anomaly notification frames but the static frames may be assigned thereto. However, the dynamic frames may be better assigned to serve as such frames. This is because even if an unauthorized ECU spoofs and transmits an error notification frame, the other monitoring ECUs grasp the occurrence of the error at the time of transmitting the spoofed frame. As a result, it becomes difficult for the unauthorized ECU to invalidate the error notification frame, which improves the safety.

(6) In the embodiment described above, the cycles of transmitting the error notification frames, the mode transition frames to the invalidation mode, and the anomaly notification frames in accordance with the branch including the monitoring ECU. Alternatively, the transmission cycles may not be determined in accordance with the branches.

For example, the frames described above may be assigned to IDs different from branch to branch. However, the transmission cycles may be better determined in accordance with the branches. This is because the limited space may be efficiently utilized for the IDs.

(7) In the embodiment described above, the monitoring ECUs shift to the invalidation mode with a mode transition frame but may shift to the invalidation mode without any mode transition frame. This will be described below more specifically.

For example, assume that different branches in the on-board network include at least two monitoring ECUs (i.e., a first error monitoring ECU and one or more second error monitoring ECUs) each of which includes at least an error detector and a frame transmitting and receiving unit. In this case, each of one or more second error monitoring devices may further include an error state holder that holds at least one of the number of error detections and the number of receptions of an error notification frame for each frame type. In the first error monitoring device, the first error detector further monitors whether an error occurs in the error notification frame transmitted by the first frame transmitting and receiving unit. Detecting an occurrence of an error in the error notification frame, the first frame transmitting and receiving unit may transmit an anomaly notification frame for notifying of the occurrence of the anomaly in transmitting and receiving the error notification frame. Assume that in each of the one or more second error monitoring devices, a second frame transmitting and receiving unit receives an anomaly notification frame. The second error detector may regard, as a frame to be invalidated, a frame whose number of error detections or whose number of receptions held in the error state holder is greater than or equal to a predetermined number and shift the one or more second error monitoring devices to the invalidation mode.

This configuration allows invalidation of unauthorized frames, even if the frame for notifying of an error is replaced with an unauthorized frame. The configuration allows a shift to the invalidation mode without transmitting any mode transition frame, which is advantageous in invalidating unauthorized frames as soon as possible. Accordingly, the safety of the on-board network further improves.

Note that each monitoring ECU may shift to the invalidation mode with neither a mode transition frame to the invalidation mode nor an anomaly notification frame. For example, an error notification frame transmitted by one of monitoring ECUs is received one or more of the other monitoring ECUs without detecting an error in an ID corresponding to the error notification frame. In this case, the other monitoring ECUs may determine that there is a mismatch and shift to the invalidation mode. In the stage described above, the other monitoring ECUs may shift to the invalidation mode in accordance with the number of receptions of an error notification frame.

This configuration allows a shift to the invalidation mode without transmitting any mode transition frame to the invalidation mode, which is advantages in invalidating unauthorized frames as soon as possible. In addition, a communication malfunction and transmission of an unauthorized frame are determined based on the number of receptions of an error notification frame to take proper measures according to the anomaly conditions.

(8) In the embodiment described above, the monitoring ECUs count the number of error detections as the branch conditions. The configuration is however not limited thereto. The monitoring ECUs may count the number of error detections as the branch conditions within a predetermined time period only. For example, the monitoring ECUs may reset the value every 64 cycles. This removes the influence of the past error detection and is thus advantageous.

(9) In the embodiment described above, the frames with the same slot ID are transmitted to be invalidated but the transmitted frames, that is, the frames with the same slot ID may be null or other frames.

(10) In the embodiment described above, the monitoring ECUs update the branch conditions by receiving the error notification frames. The configuration is however not limited thereto. The monitoring ECUs may update the branch conditions when an error notification frame is detected as an error.

This configuration allows detection of an error regardless of the content of the payload, even if an unauthorized ECU causes a frame collision to invalidate an error notification frame. That is, the configuration is advantageous in improving the safety.

(11) In the embodiment described above, the monitoring ECU of a certain branch transmits a mode transition frame to the invalidation mode to the monitoring ECUs of the other branches. The configuration is however not limited thereto. The monitoring ECU of a certain branch may include some of the other monitoring ECUs as destinations in the payload, for example, to shift these monitoring ECUs to the invalidation mode.

For example, the monitoring ECU of a certain branch may sequentially switch the monitoring ECUs in the other branches to the invalidation mode. At the switch to the invalidation mode in each branch, the monitoring ECU of a certain branch may specify the branch including the unauthorized ECU based on the number of the received error notification frames. This will be described below more specifically.

For example, different branches in the on-board network include at least two monitoring ECUs (i.e., a first error monitoring ECU and one or more second error monitoring ECUs) each of which includes at least an error detector and a frame transmitting and receiving unit. In this case, the first error detector may cause the first frame transmitting and receiving unit to transmit a transition frame for invalidating one branch among the branches to prepare a period in which at least one of the one or more second error monitoring devices connected to the one branch shifts to the invalidation mode and others of the one or more second error monitoring devices connected to one or more of the branches other than the one branch do not shift to the invalidation mode. The first error detector may detect the number of error notification frames received from the at least one of the one or more second error monitoring devices during the period. After a lapse of a predetermined time after the first frame transmitting and receiving unit has transmitted the transition frame, the first error detector causes the first frame transmitting and receiving unit to transmit another transition frame for invalidating another branch among the branches to cause the first frame transmitting and receiving unit to transmit transition frames for sequentially invalidating the branches. At the end, one of the branches detected as having a maximum number of error notification frames received from the one or more second error monitoring devices may be determined as an unauthorized branch. Here, the transition frame contains a validation flag indicating a shift to the invalidation mode and a value identifying a branch to be shifted to the invalidation mode. In each of the one or more second error monitoring devices, when the second frame transmitting and receiving unit receives the transition frame and the branch identified by the value contained in the transition frame is identical to the branch connected to the second error monitoring device, the second error detector may shift the second error monitoring device to the invalidation mode.

Now, an example method of specifying the branch including an unauthorized ECU based on the number of error notification frames at the time of causing the invalidation mode in each branch will be described with reference to FIGS. 15 to 16D.

FIG. 15 shows an example transition frame according to a variation of this embodiment. The same reference characters as those in FIG. 11A are used to represent equivalent elements, and the detailed explanation thereof will be omitted. The transition frame shown in FIG. 15 includes the destination branch in addition to the items of the error notification frame shown in FIG. 11A. Note that a validation flag indicating a shift to the invalidation mode corresponds to the payload including the frame content indicating a request for a mode change and the mode change information indicating the invalidation mode. Accordingly, the transition frame shown in FIG. 15 is transmitted from branch 100d as the transmitter branch to branch 100a as the destination branch to shift the destination branch to the invalidation mode. Including the frame content indicating the request for a mode change and the mode change information indicating the normal mode as the payload, the transition frame shown in FIG. 15 will be referred to as a "mode transition frame to the normal mode".

FIGS. 16A to 16D show an example operation sequence in which an anti-fraud control system according to a variation of this embodiment sequentially switches the branches to the invalidation mode to specify the branch including an unauthorized ECU. Note that each area surrounded by a dotted line represents one slot unit, that is, the period of the same slot ID.

Like the embodiment described above, the following description assumes that an attacker takes control of ECU 200c via external communication module 230 and ECU 200c whose control is taken away by the attacker transmits a spoofed frame such as an unauthorized steering instruction frame.

Figure 16A:
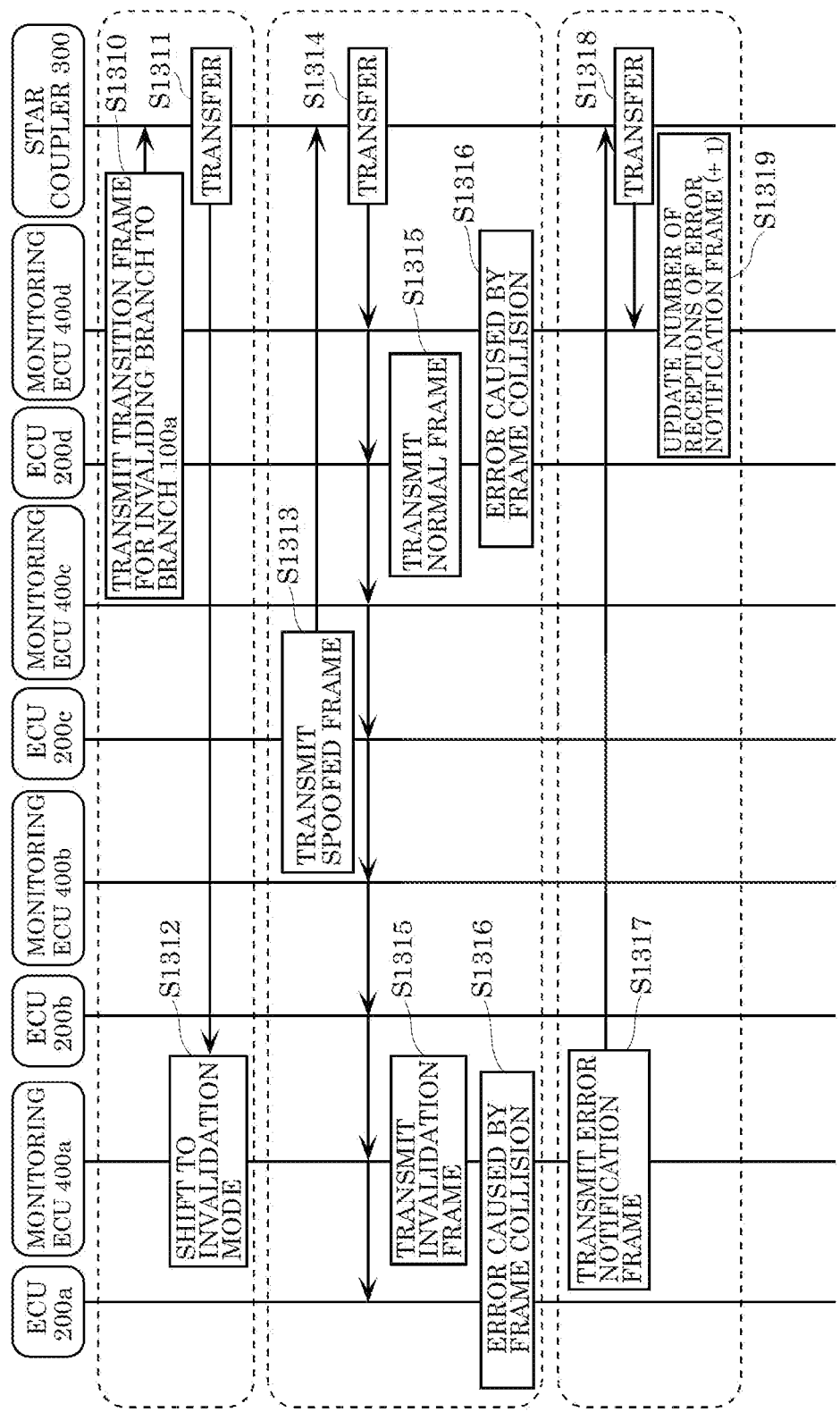
FIG. 16A shows an example operation sequence in which an anti-fraud control system according to a variation of the embodiment sequentially switch the branches to the invalidation mode to identify the branch including an unauthorized ECU.

First, as shown in FIG. 16A, ECU 200d transmits a transition frame for invaliding the branch to branch 100a (S1310). Here, with respect to the transition frame shown in FIG. 15, 100a is set to the destination branch, whereas 100d is set to the transmitter branch.

Next, star coupler 300 transfers the transition frame to other branches 100a to 100c (S1311).

Then, monitoring ECU 400a receives the transition frame and shifts to the invalidation mode (S1312). Being not the destinations, monitoring ECUs 400b and 400c also receive but discard the transition frames. That is, monitoring ECUs 400b and 400c do not shift to the invalidation mode.

In the period of the next slot unit, first, ECU 200c whose control is taken away transmits a spoofed frame (S1313).

After that, star coupler 300 transfers the spoofed frame to other branches 100a, 100b, and 100d (S1314).

Next, ECU 200d whose control is not taken by any attacker (i.e., an authorized ECU) transmits a normal frame, whereas monitoring ECU 400a that has shifted to the invalidation mode transmits an invalidation frame (S1315).

Errors are then caused by frame collisions in branch 100a connected to ECU 200a and branch 100d connected to ECU 200d (S1316). More specifically, in branch 100a connected to ECU 200a, the spoofed frame transferred from star coupler 300 collides with the invalidation frame transmitted by ECU 200a, thereby causing an error. In branch 100d connected to ECU 200d, the spoofed frame transferred from star coupler 300 collides with the normal frame transmitted by ECU 200d, thereby causing an error. Note that monitoring ECUs 400a and 400d detect the occurrence of the errors caused by the frame collisions.

In the period of the next slot unit, first, monitoring ECU 400a transmits an error notification frame based on the error caused in branch 100a (S1317).

Next, star coupler 300 transfers the error notification frame to branch 100d (S1318).

Monitoring ECU 400d then receives the error notification frame flowing through branch 100d and updates the number of receptions of an error notification as the branch conditions (S1319).

In this manner, monitoring ECU 400d transmits the transition frame for invalidating one of the branches to prepares a period in which monitoring ECU 400a connected to the one of the branches shifts to the invalidation mode and monitoring ECUs 400b and 400c connected to the other branches do not shift to the invalidation mode. In this period, monitoring ECU 400d detects the error notification frame received from monitoring ECU 400a.

Figure 16B:
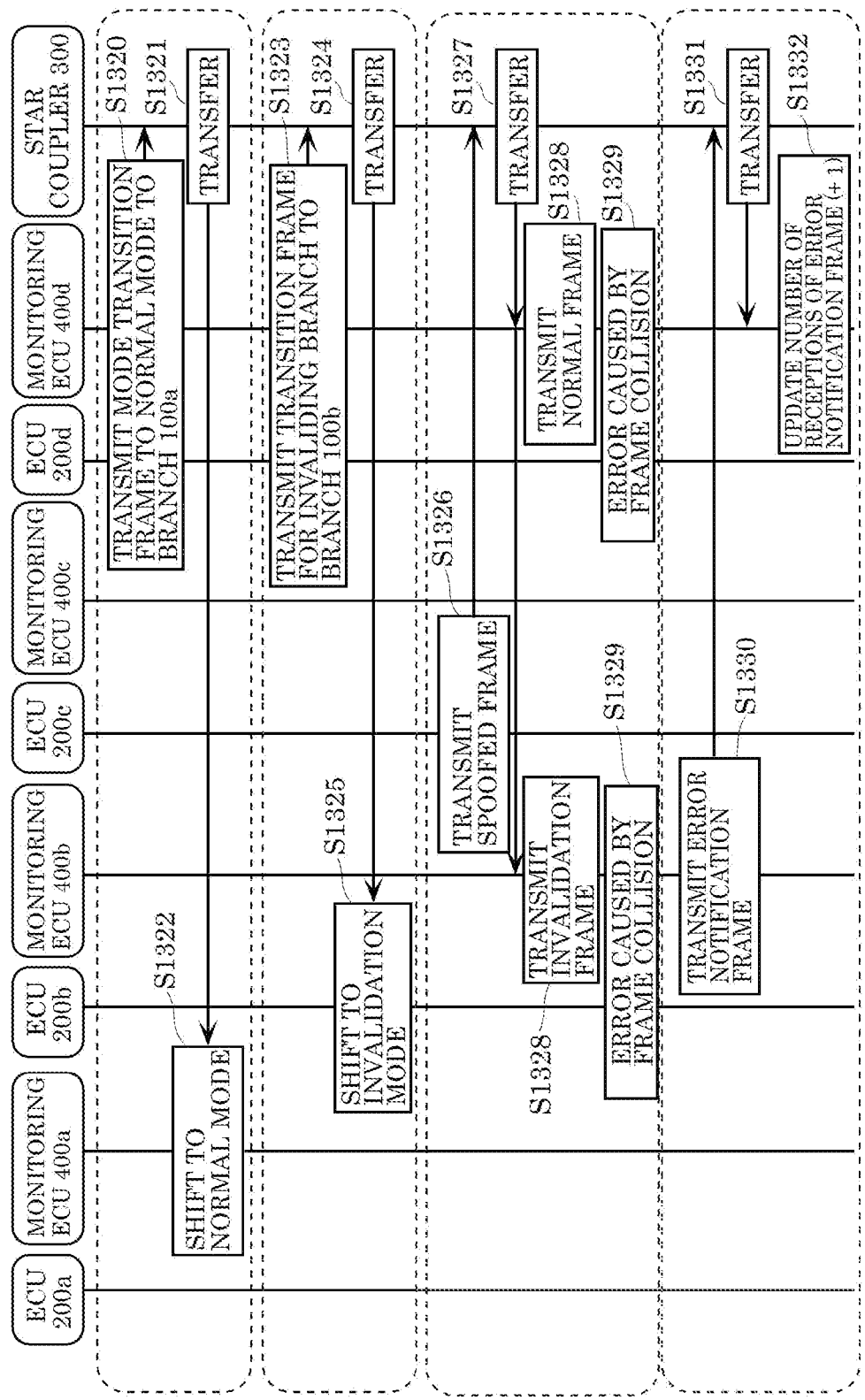
FIG. 16B shows the example operation sequence in which the anti-fraud control system according to the variation of the embodiment sequentially switch the branches to the invalidation mode to identify the branch including the unauthorized ECU.

As shown in FIG. 16B, in the period of the next slot unit, first, ECU 200d transmits a mode transition frame to the normal mode to branch 100a (S1320). Here, with respect to the mode transition frame to the normal mode, in FIG. 15, 100a is set to the destination branch, whereas 100d is set to the transmitter branch. In the payload, a request for a mode change is set to the frame content, whereas the normal mode is set to the mode change information.

Next, star coupler 300 transfers the mode transition frame to the normal mode to branch 100a (S1321).

Then, monitoring ECU 400a receives the mode transition frame to the normal mode and shifts from the invalidation mode to the normal mode (S1322).

In the period of the next slot unit, first, ECU 200d transmits a transition frame for invalidating the branch to branch 100b (S1323). The details are as described above and the explanation thereof will this be omitted.

After that, once star coupler 300 transfers the transition frame to other branches 100a to 100c (S1324), monitoring ECU 400b receives the transition frame and shifts to the invalidation mode (S1325).

In the period of the next slot unit, first, ECU 200c whose control is taken away transmits a spoofed frame (S1326).

Next, star coupler 300 transfers the spoofed frame to other branches 100a, 100b, and 100d (S1327).

After that, authorized ECU 200d transmits a normal frame, whereas monitoring ECU 400b that has shifted to the invalidation mode transmits an invalidation frame (S1328).

Errors are then caused by frame collisions in branch 100b connected to ECU 200b and branch 100d connected to ECU 200d (S1329). Note that monitoring ECUs 400b and 400d detect the errors caused by the frame collisions as in step S1316.

In the period of the next slot unit, first, monitoring ECU 400b transmits an error notification frame based on the error caused in branch 100b (S1330).

Next, when star coupler 300 transfers the error notification frame to branch 100d (S1331), monitoring ECU 400d receives the error notification frame flowing through branch 100d and updates the number of receptions of an error notification as the branch conditions (S1332).

As shown in FIG. 16C, in the period of the next slot unit, monitoring ECU 400b shifts to the normal mode as described above (S1333).

In the period of the next slot unit, monitoring ECU 400c shifts to the invalidation mode as described above (S1334).

In the period of the next slot unit, first, ECU 200c whose control is taken away transmits a spoofed frame (S1335).

Next, star coupler 300 starts transfer processing, that is, starts transferring the spoofed frame (S1336).

Here, monitoring ECU 400c that has shifted to the invalidation mode transmits an invalidation frame (S1337).

In branch 100c, the spoofed frame that has already started being transmitted then collides with the invalidation frame transmitted by monitoring ECU 400c, thereby causing an error (S1338).

Star coupler 300 then transfers, to other branches 100d and 100a, a signal indicating that the error is caused by the frame collision (S1339).

In this case, in the period of the next slot unit, monitoring ECU 400a transmits an error notification frame based on the error caused in branch 100a. Monitoring ECU 400d receives the error notification frame and updates the number of receptions of an error notification as the branch conditions (S1340).

Similarly, in the period of the next slot unit, monitoring ECU 400b transmits an error notification frame based on the error caused in branch 100b. Monitoring ECU 400d receives the error notification frame and updates the number of receptions of an error notification as the branch conditions (S1341).

Similarly, in the period of the next slot unit, monitoring ECU 400c transmits an error notification frame based on the error caused in branch 100c. Monitoring ECU 400d receives the error notification frame and updates the number of receptions of an error notification as the branch conditions (S1342).

As shown in FIG. 16D, in the period of the next slot unit, monitoring ECU 400c shifts to the normal mode as described above (S1343).

As described above, monitoring ECU 400d counts the number of error notification frames at the time of causing the invalidation mode in each branch. In the example shown in FIGS. 16A to 16D, the error notification number is three, that is, the maximum in the invalidation mode of branch 100c. Thus, monitoring ECU 400d specifies branch 100c as an unauthorized branch (i.e., an anomalous branch). That is, monitoring ECU 400d may transmit transition frames for sequentially invalidating the plurality of branches, and determine, as the unauthorized branch, one of the branches that have received the maximum number of error notification frames. In other words, the branch, which includes the monitoring ECU in the invalidation mode when the number of error notification frames is the maximum, can be determined as the unauthorized branch including an unauthorized ECU.

(12) In the embodiment described above, the branch conditions are stored in the plaintext but may be encoded and stored.

(13) The embodiment has been described above where the error notification frames, the mode transition frames to the invalidation mode, and the anomaly notification frames are transmitted unchanged in the plaintext. The configuration is however not limited thereto. These frames may be encoded and transmitted, or may be transmitted with message verification codes added. Accordingly, transmission of the error notification frames and switching of the modes can be achieved safely, whereby an improvement in the safety can be expected.

(14) In the embodiment described above, the shift to the invalidation mode is performed upon receipt of a frame such as a mode transition frame to the invalidation mode. The actual shift may be performed under the following conditions. Specifically, whether an actual shift to the invalidation mode may be performed in accordance with the state, such as traveling or stop, of the vehicle, or the attribute of a frame such as a control frame or a state frame. This configuration allows, as necessary, execution of invalidation of frames which lead to fraud control, which eventually reduces the power consumption.

(15) In the embodiment described above, the on-board network is under the FlexRay protocol, but is not limited thereto. For example, CAN, CAN with Flexible Data Rate (CAN-FD), Ethernet, Local Interconnect Network (LIN), Media Oriented Systems Transport (MOST) may be used. Alternatively, the on-board network may be a combination of these networks as sub-networks. The network under a time-triggered protocol is particularly advantageous.

Other Embodiments

The present disclosure has been described above based on the embodiment and the variation. The present disclosure is obviously not limited thereto. The present disclosure also covers the following cases.

(1) Each of the devices in the embodiment described above may be a computer system including, specifically, a microprocessor, a ROM, a RAM, a hard disk unit, a display unit, a keyboard, or a mouse. The RAM or the hard disk unit stores computer programs. The microprocessor operates in accordance with the computer programs so that the devices fulfill their functions. The computer programs are here obtained by combining instruction codes indicating instructions to the computer to fulfill predetermined functions.

(2) Some or all of the constituent elements of each of the devices in the embodiment described above may serve as a single system large-scale integrated (LSI) circuit. The system LSI circuit is a super multifunctional LSI circuit manufactured by integrating a plurality of components on a single chip, and is a computer system including, specifically, a microprocessor, a ROM, and a RAM, for example. The RAM stores computer programs. The microprocessor operates in accordance with the computer programs so that the system LSI circuit fulfils its function.

The constituent elements of the devices may be configured as respective chips, or some or all of the constituent elements may be included into a single chip.

While the system LSI circuits are named here, the integrated circuits may be referred to ICs, LSI circuits, super LSI circuits, or ultra-LSI circuits depending on the degree of integration. The circuit integration is not limited to the LSI. The devices may be dedicated circuits or general-purpose processors. A field programmable gate array (FPGA) programmable after the manufacture of an LSI circuit or a reconfigurable processor capable of reconfiguring the connections and settings of circuit cells inside an LSI may be employed.

Appearing as an alternative circuit integration technology to the LSI, another technology that progresses or deprives from the semiconductor technology may be obviously employed for integration of functional blocks. Biotechnology is also applicable.

(3) Some or all of the constituent elements of each of the devices described above may serve as an IC card or a single module detachably attached to the device. The IC card or the module is a computer system including a microprocessor, a ROM, and a RAM, for example. The IC card or the module may include the super multifunctional LSI circuit described above. The microprocessor operates in accordance with computer programs so that the IC card or the module fulfils its function. This IC card or this module may have a tamper resistance.

(4) The present disclosure may be directed to the method described above. The present disclosure may also be directed to computer programs causing a computer to execute this method or digital signals indicating the computer programs.

The present disclosure may be directed to a computer readable storage medium capable of recording computer programs or digital signals, for example, a flexible disk, a hard disk, a CD-ROM, an MO, a DVD, a DVD-ROM, a DVD-RAM, a Blu-ray Disk (BD, registered trademark), or a semiconductor memory, for example. The present disclosure may be directed to the digital signals stored in these recording media.

In the present disclosure, the computer programs or the digital signals may be transferred via telecommunication lines, wireless or wired communication lines, networks represented by the internet, or data broadcasts, for example.

The present disclosure may be directed to a computer system including a microprocessor and a memory. The memory may store the computer programs described above, whereas the microprocessor may operate in accordance with the computer programs.

The programs or the digital signals may be stored in a storage medium and then transferred, or may be transferred via a network, so as to be executed by another independent computer system.

(5) The embodiment and variation described above may be combined.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure provides a safe on-board network system that monitors frames flowing on an on-board network, and detects and invalidates unauthorized frames. Accordingly, the on-board network system is kept safe as a whole.

What is claimed is:

1. An anti-fraud control system in an onboard network under a time-triggered communication protocol based on time slots, the on-hoard network being connected, for each of branches, to one or more electronic control devices each transmitting and receiving a frame within a predetermined time slot, the anti-fraud control system comprising:
    error monitoring devices each for a corresponding one of the branches, wherein
    a first error monitoring device among the error monitoring devices includes:
        a first frame transmitting and receiving hardware unit that receives the frame flowing on the on-board network; and
        a first hardware error detector that monitors whether an error occurs in the frame received by the first frame transmitting and receiving hardware unit, and causes the first frame transmitting and receiving hardware unit to transmit an error notification frame when detecting an occurrence of an error in the frame received by the first frame transmitting and receiving hardware unit, the error notification frame containing information identifying a type of the frame subjected to the error and for notifying of the occurrence of the error in the frame, and
    each of one or more second error monitoring devices different from the first error monitoring device among the error monitoring devices includes:
        a second frame transmitting and receiving hardware unit that receives the error notification frame; and
        a second hardware error detector that regards, as a frame to be invalidated, the frame subjected to the error and included in the error notification frame received, and shifts the second error monitoring device to an invalidation mode for invalidating reception of subsequent frames, when no error is detected in the corresponding one of the branches with respect to the frame.

2. The anti-fraud control system according to claim 1, wherein
    in each of the one or more second error monitoring devices,
        the second frame transmitting and receiving hardware unit transmits/receives a frame within a predetermined time slot of the on-board network, and
        when the second error monitoring device is in the invalidation mode, the second hardware error detector invalidates reception of the frame to be invalidated by causing the second frame transmitting and receiving hardware unit not to receive the frame to be invalidated or by causing the second frame transmitting and receiving hardware unit to transmit a frame having a same identifier as the frame to be invalidated in a same time slot as the frame to be invalidated.

3. The anti-fraud control system according to claim 2, wherein
    in the first error monitoring device,
        when detecting that no error notification frame for notifying of an occurrence of an error in the corresponding one of the branches is received from the one or more second error monitoring devices with respect to the frame subjected to the error and included in the error notification frame transmitted by the first frame transmitting and receiving hardware unit, the first hardware error detector causes the first frame transmitting and receiving hardware unit to transmit an mode transition frame for shifting the one or more second error monitoring devices to the invalidation mode, and
    in each of the one or more second error monitoring devices,
        when detecting that the second frame transmitting and receiving hardware unit has received the mode transition frame, the second hardware error detector determines that no error is detected in the corresponding one of the branches and shifts the second error monitoring device to the invalidation mode.

4. The anti-fraud control system according to claim 2, wherein
    in the first error monitoring device,
        when detecting that no error notification frame for notifying of an occurrence of an error in the corresponding one of the branches is received from the one or more second error monitoring devices with respect to the frame subjected to the error and included in the error notification frame transmitted by the first frame transmitting and receiving hardware unit, the first hardware error detector causes the first frame transmitting and receiving hardware unit to transmit the mode transition frame for shifting the one or more second error monitoring devices to the invalidation mode,
        the first hardware error detector further monitors whether an error occurs in the mode transition frame transmitted by the first frame transmitting and receiving hardware unit, and causes the first frame transmitting and receiving hardware unit to transmit an anomaly notification frame for notifying of an occurrence of an anomaly in transmitting and receiving the mode transition frame, when detecting the occurrence of the error in the mode transition frame, and
    in each of the one or more second error monitoring devices,
        when detecting that the second frame transmitting and receiving hardware unit has received the anomaly notification frame, the second hardware error detector shifts the second error monitoring device to the invalidation mode.

5. The anti-fraud control system according to claim 2, wherein
    each of the one or more second error monitoring devices further includes an error state holder that holds at least one of a total number of error detections or a total number of receptions of an error notification frame for each frame type,
    in the first error monitoring device,
        the first hardware error detector further monitors whether an error occurs in the error notification frame transmitted by the first frame transmitting and receiving hardware unit, and causes the first frame transmitting and receiving hardware unit to transmit an anomaly notification frame for notifying of an occurrence of an anomaly in transmitting and receiving the error notification frame when detecting the occurrence of the error in the error notification frame, and in each of the one or more second error monitoring devices, when the second frame transmitting and receiving hardware unit has received the anomaly notification frame, the second hardware error detector regards, as the frame to be invalidated, a frame whose number of error detections or whose number of receptions held in the error state holder is greater than or equal to a predetermined number, and shifts the second error monitoring device to the invalidation mode.

6. The anti-fraud control system according to claim 1, wherein
the time-triggered communication protocol is a FlexRay protocol, and
the error is any one of a synchronization (sync) error, a content error, a boundary violation, or a transmission (Tx) conflict defined by the FlexRay protocol.

7. The anti-fraud control system according to claim 6, wherein
the on-board network is based on a star topology including a star coupler to transmit and receive a frame to and from the branches via the star coupler,
the error notification frame is a dynamic frame under the FlexRay protocol, and
the first frame transmitting and receiving hardware unit determines a total number of cycles of transmitting the error notification frame in accordance with one of the branches connected to the first error monitoring device.

8. The anti-fraud control system according to claim 7, wherein
in the first error monitoring device,
the first hardware error detector causes the first frame transmitting and receiving hardware unit to transmit a transition frame for invalidating one branch among the branches to prepare a period in which at least one of the one or more second error monitoring devices connected to the one branch shifts to the invalidation mode and others of the one or more second error monitoring devices connected to one or more of the branches other than the one branch do not shift to the invalidation mode, and detects a total number of error notification frames received from the at least one of the one or more second error monitoring devices during the period,
after a lapse of a predetermined time after the first frame transmitting and receiving hardware unit has transmitted the transition frame, the first hardware error detector causes the first frame transmitting and receiving hardware unit to transmit another transition frame for invalidating another branch among the branches to cause the first frame transmitting and receiving hardware unit to transmit transition frames for sequentially invalidating the branches, and
one of the branches detected as having a maximum number of error notification frames is determined as an unauthorized branch.

9. The anti-fraud control system according to claim 8, wherein
the transition frame contains a validation flag indicating a shift to the invalidation mode and a value identifying a branch to be shifted to the invalidation mode.

10. The anti-fraud control system according to claim 9, wherein
in each of the one or more second error monitoring devices,
when the second frame transmitting and receiving hardware unit receives the transition frame and the branch identified by the value contained in the transition frame is identical to the one of the branches connected to the second error monitoring device, the second hardware error detector shifts the second error monitoring device to the invalidation mode.

11. The anti-fraud control system according to claim 1, wherein
in each of the one or more second error monitoring devices,
the second frame transmitting and receiving hardware unit transmits a first frame within a predetermined time slot of the on-board network, and
when the one or more second error monitoring devices is in the invalidation mode, the second hardware error detector causes the second frame transmitting and receiving hardware unit to transmit the first frame at a transmission start time earlier than a predetermined transmission start time within the predetermined time slot to invalidate reception of the frame to be invalidated.

12. A monitoring device in an on-board network under a time-triggered communication protocol based on time slots, the on-board network being connected to, for one of branches, one or more electronic control devices each transmitting and receiving a frame within a predetermined time slot, the monitoring device being provided for a corresponding one of the branches and comprising:
a frame transmitting and receiving hardware unit that receives an error notification frame transmitted for notifying of an occurrence of an error in the frame flowing on the on-board network and containing information identifying a type of the frame subjected to the error at the occurrence of the error in the frame; and
a hardware error detector that regards, as a frame to be invalidated, the frame subjected to the error and included in the error notification frame received, and shifts the monitoring device to an invalidation mode for invalidating reception of subsequent frames, if no error is detected in the corresponding one of the branches with respect to the frame.

13. The monitoring device according to claim 12, wherein
the frame transmitting and receiving hardware unit receives the frame flowing on the on-board network, and
the hardware error detector monitors whether an error occurs in a first frame received by the frame transmitting and receiving hardware unit and causes the frame transmitting and receiving hardware unit to transmit a first error notification frame when detecting an occurrence of an error in the first frame received by the frame transmitting and receiving hardware unit, the first error notification frame containing information identifying a type of the first frame subjected to the error and for notifying of the occurrence of the error in the first frame.

14. An anti-fraud control method using an anti-fraud control system in an on-board network under a time-triggered communication protocol based on time slots, the on-board network being connected, for each of branches, to one or more electronic control devices each transmitting and receiving a frame within a predetermined time slot, the anti-fraud control system including error monitoring devices each for a corresponding one of the branches, the anti-fraud control method comprising:

receiving the frame flowing on the on-board network using a first error monitoring device among the error monitoring devices;

monitoring whether an error occurs in the frame received in the receiving using the first error monitoring device, and transmitting an error notification frame in the receiving, if an occurrence of an error is detected in the frame received in the receiving, the error notification frame containing information identifying a type of the frame subjected to the error and for notifying of the occurrence of the error in the frame;

receiving the error notification frame using each of one or more second error monitoring devices different from the first error monitoring device of the error monitoring device; and regarding, as a frame to be invalidated, the frame subjected to the error and included in the error notification frame received in receiving of the error notification frame, and shifting the one or more second error monitoring devices to an invalidation mode for invalidating reception of subsequent frames, if no error is detected in the corresponding one of the branches with respect to the frame.

\* \* \* \* \*